US008752713B2

(12) United States Patent
Teramachi et al.

(10) Patent No.: US 8,752,713 B2
(45) Date of Patent: Jun. 17, 2014

(54) HOLLOW POROUS MEMBRANE AND PROCESS FOR PRODUCING THE SAME

(75) Inventors: Masashi Teramachi, Toyohashi (JP); Kei Murase, Toyohashi (JP); Toshinori Sumi, Iwakuni (JP); Yasuo Hiromoto, Iwakuni (JP); Hiroyuki Fujiki, Hatsukaichi (JP); Masaki Kurashina, Otake (JP); Masakazu Minagawa, Toyohashi (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 174 days.

(21) Appl. No.: 12/993,709

(22) PCT Filed: May 21, 2009

(86) PCT No.: PCT/JP2009/059385
§ 371 (c)(1),
(2), (4) Date: Feb. 2, 2011

(87) PCT Pub. No.: WO2009/142279
PCT Pub. Date: Nov. 26, 2009

(65) Prior Publication Data
US 2011/0114553 A1 May 19, 2011

(30) Foreign Application Priority Data

May 21, 2008 (JP) ................................. 2008-133504

(51) Int. Cl.
B01D 29/46 (2006.01)
B01D 39/14 (2006.01)
B32B 15/00 (2006.01)
B29C 47/00 (2006.01)

(52) U.S. Cl.
USPC ................. 210/500.23; 210/490; 210/500.27; 264/177.14; 264/177.15; 264/178 R; 264/184; 427/246

(58) Field of Classification Search
CPC ........ B01D 69/08; B01D 69/04; B01D 69/10; B01D 69/12; B01D 71/34; C08L 27/16; B29C 70/222; B29C 47/04; B29C 47/23; B29K 2027/16
USPC .......... 210/500.23, 490, 500.27; 264/41, 103, 264/177.14, 177.15, 174, 178 R, 184, 264/177.26, 177.27, 209.1, 166; 428/375; 427/246, 407.1
See application file for complete search history.

(56) References Cited

U.S. PATENT DOCUMENTS 3,676,193 A * 7/1972 Cooper, IV et al. .......... 427/230
3,981,556 A * 9/1976 Sabatelli et al. .............. 439/874
(Continued)

FOREIGN PATENT DOCUMENTS

CA 986422 * 3/1976
CN 1683059 A 10/2005
(Continued)

OTHER PUBLICATIONS

International Search Report issued Aug. 4, 2009 in PCT/JP09/059385 filed May 21, 2009.
(Continued)

Primary Examiner — Ana Fortuna
(74) Attorney, Agent, or Firm — Oblon, Spivak, McClelland, Maier & Neustadt, L.L.P.

(57) ABSTRACT

A hollow porous membrane with a reduced cost and excellent separation characteristic, water permeability, and mechanical strength and a process of producing the hollow porous membrane with an excellent adhesive property between a support and a porous membrane layer at a low cost are provided. The hollow porous membrane includes a porous membrane layer in which dense layers are disposed in the vicinities of an outer surface and an inner surface. In the process of producing the hollow porous membrane, membrane-forming dopes of a first membrane-forming dope and a second membrane-forming dope, which contain the material of the porous membrane layer and a solvent, are successively applied and stacked onto the outer circumferential surface of a hollow support and the applied membrane-forming dopes are simultaneously coagulated. In the process of producing the hollow porous membrane, a porous membrane layer is formed by applying a membrane-forming dope containing a material of the porous membrane layer and a solvent to the outer circumferential surface of the hollow support and coagulating the applied dope, and a hollow braid obtained by circularly knitting a yarn formed of multi-filaments is used as the support.

19 Claims, 12 Drawing Sheets

(56) References Cited

U.S. PATENT DOCUMENTS

| | | | |
|---|---|---|---|
| 4,181,694 A * | 1/1980 | Hashino et al. | 264/41 |
| 4,402,940 A | 9/1983 | Nose et al. | |
| 4,612,119 A * | 9/1986 | Eguchi | 210/500.23 |
| 4,882,223 A * | 11/1989 | Aptel et al. | 428/398 |
| 4,933,081 A * | 6/1990 | Sasaki et al. | 210/490 |
| 5,080,547 A * | 1/1992 | Moghe | 411/436 |
| 5,232,601 A * | 8/1993 | Chu et al. | 210/646 |
| 5,472,607 A * | 12/1995 | Mailvaganam et al. | 210/490 |
| 5,914,039 A * | 6/1999 | Mahendran et al. | 210/500.25 |
| 6,354,444 B1 * | 3/2002 | Mahendran et al. | 210/490 |
| 6,454,943 B1 * | 9/2002 | Koenhen | 210/500.21 |
| 7,267,872 B2 * | 9/2007 | Lee et al. | 428/376 |
| 7,632,439 B2 * | 12/2009 | Mullette et al. | 264/41 |
| 8,181,792 B2 * | 5/2012 | Kools | 210/490 |
| 2001/0047959 A1 | 12/2001 | Oishi et al. | |
| 2003/0134550 A1 | 7/2003 | Lee et al. | |
| 2004/0197557 A1 * | 10/2004 | Eshraghi et al. | 428/375 |
| 2006/0180544 A1 * | 8/2006 | Kools | 210/490 |
| 2007/0116871 A1 | 5/2007 | Lee et al. | |
| 2008/0183132 A1 * | 7/2008 | Davies et al. | 604/103.09 |
| 2011/0142584 A1 * | 6/2011 | Wang | 414/520 |
| 2012/0045580 A1 * | 2/2012 | Fujiki et al. | 427/246 |

FOREIGN PATENT DOCUMENTS

| | | | |
|---|---|---|---|
| EP | 1374704 | * | 11/1974 |
| EP | 1658889 | * | 5/2006 |
| JP | 53 104578 | | 9/1978 |
| JP | 53 132478 | | 11/1978 |
| JP | 60 035031 | | 2/1985 |
| JP | 60 045358 | | 3/1985 |
| JP | 62-19205 A | * | 7/1985 |
| JP | 10 235170 | | 9/1998 |
| JP | 2003 225542 | | 8/2003 |
| JP | 2003 311133 | | 11/2003 |
| JP | 2006 068710 | | 3/2006 |
| JP | 2007-245107 | | 9/2007 |
| JP | 2008-105014 | | 5/2008 |
| TW | 337537 A | | 8/1998 |
| WO | 98 58728 | | 12/1998 |
| WO | 2004 043579 | | 5/2004 |
| WO | 2008066340 A1 | * | 6/2008 |

OTHER PUBLICATIONS

Combined Office Action and Search Report issued Nov. 2, 2012 in Chinese Patent Application No. 200980118078.0 with partial English language translation and with English translation of categories of cited documents.

Office Action issued Feb. 18, 2013, in Canadian Patent Application No. 2,794,419.

Notice of Allowance in Application No. 2013-165508 mailed Apr. 22, 2014 with English translation.

* cited by examiner

HOLLOW POROUS MEMBRANE AND PROCESS FOR PRODUCING THE SAME

TECHNICAL FIELD

The present invention relates to a hollow porous membrane which is a micro-filtration membrane or ultra-filtration membrane and which is suitable for water treatment and a process of producing the hollow porous membrane.

Priority is claimed on Japanese Patent Application No. 2008-133504, filed on May 21, 2008, the content of which is incorporated herein by reference.

BACKGROUND ART

Recently, with an increase in interest in environmental contamination and reinforcement of the regulation thereof, water treatment employing a membrane method using a filtration membrane excellent in completeness of separation or compactness has attracted attention. For use in water treatment, a filtration membrane requires excellent separation characteristic or water permeability and high mechanical strength.

In the past, filtration membranes formed of polysulfone, polyacrylonitrile, cellulose acetate, polyvinylidenefluoride, and the like using a wet or dry-wet spinning method were known as the filtration membrane excellent in water permeability. Such filtration membranes have a high-porosity and asymmetric structure through microphase-separating a polymer solution and coagulating the polymer solution in a non-solvent.

Among the materials of the filtration membranes, since the polyvinylidenefluoride resin is excellent in chemical resistance and heat resistance, it is suitably used as the material of a separation membrane. However, the filtration membranes formed of a polyvinylidenefluoride hollow fiber membrane having been proposed so far have a problem in that one of separation characteristic, water permeability, and mechanical strength is not satisfactory and a process of producing the filtration membrane satisfying all the characteristics is complicated.

A porous membrane in which a hollow braid is completely embedded in a semi-permeable porous membrane to enhance the mechanical strength has been proposed (Patent Document 1). However, such a porous membrane has a problem in that the water permeability thereof is low because it has a structure in which the braid is completely buried in the semi-permeable porous membrane and the porous membrane permeates most monofilaments.

On the contrary, a separation membrane has been proposed in which a hollow knitted braid is used as a support and a porous membrane is formed on the surface thereof to enhance both the mechanical strength and the water permeability (Patent Document 2). However, such a hollow porous membrane has a problem in that the porous membrane can be easily peeled from the braid because the porous membrane is disposed on only the surface of the braid. Since large macro voids exist in a membrane structure, there is a problem in that the separation characteristic easily deteriorates due to damage of external causes on the outer surface of the membrane.

The hollow braid used as the support is generally produced by a braiding machine. The braiding machine produces a braid by drawing out yarns from plural bobbins disposed upright on a flat panel, intersecting and knitting the yarns, and changing the positional relations of the yarns in a predetermined pattern by moving the bobbins along a predetermined path. The braid produced by the braiding machine and the hollow porous membrane using the braid as a support has the following problems.

Problem 1

Since the bobbins segmenting the yarns into small groups move in a complex way, the braiding speed of the braiding machine is low. Accordingly, there is problem in that the productivity of the support is low. When the productivity is low, the cost of the support increases, thereby causing an increase in cost of the hollow porous membrane using the support.

Problem 2

The braiding speed of the braiding machine is lower by one or more digits than the production speed of the hollow porous membrane. Accordingly, many braiding machines are required for supplying supports necessary for continuously producing the hollow porous membrane. When the yarn on a bobbin in the braiding machine runs out, it is necessary to stop the braiding machine and to carry out a yarn piecing operation such as replacement of the bobbin, incorporation of a new yarn into the braid, and cutting out ends of yarns protruding from the surface of the braid by the number of times of the number of bobbins (the number of strokes of yarns)×the number of braiding machines. Due to this complex operation, the cost of support increases, thereby causing an increase in the cost of the hollow porous membrane using the support.

Problem 3

To obtain satisfactory adhesive property of the porous membrane layer to the support, it is necessary to cause a part of the porous membrane layer to satisfactorily permeate the inside of the support. However, when the meshes of the braids are dense or the spaces between the monofilaments constituting the yarns are dense, a membrane-forming dope cannot satisfactorily permeate the meshes or fibers of the support when forming the porous membrane layer and thus the porous membrane layer is easily peeled out of the support.

On the other hand, a composite hollow fiber membrane without a defective portion of 10 μm or more has been proposed (Patent Document 3), which is obtained by applying a spinning dope including hydrophilic polymer as a non-solvent to a reinforcing material of a tubular knitted fabric in order to improve the separation characteristic. However, since the hollow fiber membrane has a dense layer, which affects the separation characteristic, only in the vicinity of the outer surface thereof, there is a problem in that the separation characteristic due to damage of external causes on the outer surface easily deteriorates. Since the non-solvent is added to the spinning dope, the spinning dope easily gels and the stability of the production process deteriorates. Since the hollow fiber membrane employs the tubular knitted fabric as the reinforcing material to enhance the mechanical strength but the permeation distance of the polymer resin membrane into the reinforcing material is set to be less than 30% of the thickness of the reinforcing material to maintain the water permeability while enhancing the mechanical strength, there is a problem in that the strength and the water permeability are not satisfactorily consistent in view of the peeling resistance of the polymer resin membrane from the reinforcing material.

On the contrary, a composite porous membrane has been proposed (Patent Document 4 and 5), which is difficult to peel out of a support and which is resistant to the damage on the outer surface thereof and has excellent stability in separation characteristic by providing two dense layers. However, since the porous membrane employs two membrane-forming processes to form two dense layers, the two layers may not be completely formed in a body. In this case, a gap may be generated between the layers and thus the outer layer may be easily peeled or damaged or defective portions of the layers may communicate with each other through the gap, thereby causing the deterioration in separation characteristics. There is a problem in that the two layers may not be completely formed in a body to maintain the water permeability and the water permeability and the peeling resistance are not consistent. A method of causing a membrane-forming solution with a low concentration of polymer to permeate important portions of a braid is employed to improve the peeling resistance between the support and the porous membrane layer. However, in this method, the adhesive portion, serving as a peeling-resistance agent, between the porous membrane layer and the support is only a fine porous portion permeating the fiber of the braid, this porous portion is formed of polymer with a low concentration to maintain the water permeability, and the peeling resistance can be improved, but there is still a problem with the strength. Since processes of producing and applying a diluted membrane-forming dope are required and two times of membrane-forming processes are employed, the production time is long and there is also a problem with production costs.

PATENT DOCUMENTS

[Patent Document 1] Japanese Unexamined Patent Application, First Publication Sho. 53-132478
[Patent Document 2] U.S. Pat. No. 5,472,607
[Patent Document 3] Japanese Laid-Open Patent Application No. 2003-225542
[Patent Document 4] Japanese Laid-Open Patent Application No. 2006-68710
[Patent Document 5] International Publication WO2004/043579

SUMMARY OF INVENTION

Problems to be Solved by the Invention

An advantage of some aspects of the invention is that it provides a hollow porous membrane with a reduced cost and excellent separation characteristic, water permeability, and mechanical strength and a process of producing the hollow porous membrane with an excellent adhesive property between a support and a porous membrane layer at a low cost.

Means for Solving the Problem

According to an aspect of the invention, there is provided a hollow porous membrane including a porous membrane layer in which dense layers are disposed in the vicinities of an outer surface and an inner surface.

According to another aspect of the invention, there is provided a process of producing the hollow porous membrane, in which membrane-forming dopes of a first membrane-forming dope and a second membrane-forming dope are successively applied and stacked onto the outer circumferential surface of a hollow support through the use of an annular nozzle and the applied membrane-forming dopes are simultaneously coagulated.

According to another aspect of the invention, there is provided a hollow porous membrane including a hollow support and a porous membrane layer disposed on the outer circumferential surface of the support, wherein the support is a hollow braid obtained by circularly knitting a yarn formed of multi-filaments.

According to another aspect of the invention, there is provided a process of producing a hollow porous membrane, wherein a porous membrane layer is formed by applying a membrane-forming dope containing a material of the porous membrane layer and a solvent to the outer circumferential surface of a hollow support and coagulating the applied dope, and a hollow braid obtained by circularly knitting a yarn formed of multi-filaments is used as the support.

Effects of the Invention

The hollow porous membrane according to the above-mentioned aspects is reduced in cost and excellent in separation characteristic, water permeability, and mechanical strength.

In the process of producing a hollow porous membrane according to the above-mentioned aspects, it is possible to produce a hollow porous membrane having an excellent adhesive property between a support and a porous membrane layer at a low cost.

EMBODIMENTS OF THE INVENTION

Figure 1:
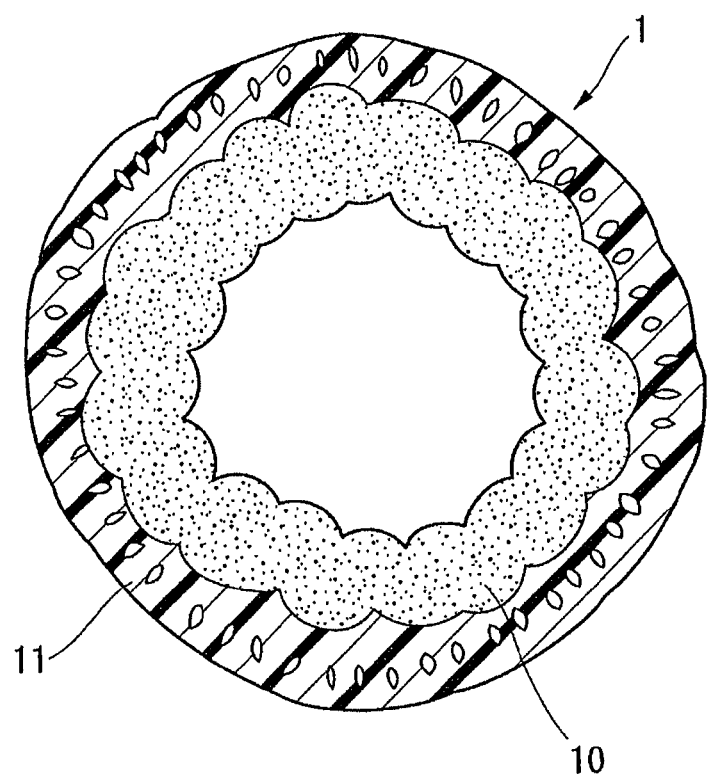
FIG. 1 is a sectional view schematically illustrating a hollow porous membrane according to the invention.

Hereinafter, exemplary embodiments of the invention will be described.

The thickness of a porous membrane layer constituting a hollow porous membrane according to the invention is preferably set to be equal to or less than 200 μm. By setting the thickness to be equal to or less than 200 μm, permeation resistance is reduced during membrane separation to obtain excellent water permeability, the coagulation time at the time of forming the porous membrane layer using a membrane-forming dope which is a polymer resin solution can be reduced, macro voids (defective portions) can be effectively suppressed, and the productivity is excellent. The thickness is more preferably set to be equal to or less than 150 μm.

The thickness of the porous membrane layer constituting the hollow porous membrane according to the invention is preferably set to be equal to or more than 100 μm. By setting the thickness to be equal to or more than 100 μm, it is possible to obtain mechanical strength causing no practical problem. However, a case where the outer diameter of the membrane is small is exceptional, because the mechanical strength can be maintained even with a thickness of less than 100 μm.

The porous membrane layer includes dense layers in the vicinities of the outer surface and the inner surface, respectively. That is, in the hollow porous membrane according to the invention, even when the dense layer in the vicinity of the outer surface is damaged, it is possible to prevent the deterioration in separation characteristic thanks to the dense layer in the vicinity of the inner surface, thereby providing stable separation performance and high durability.

Here, the dense layer means a region in which fine pores with smaller pore diameters are collected in the porous membrane layer. In the invention, it is preferable that the average pore diameter of the dense layer is in the range of 0.01 to 2 μm, to cause both the water permeability and the separation performance of the hollow porous membrane to be consistent.

To make much of the separation performance, it is more preferable that the average pore diameter of the dense layer in the vicinity of the outer surface is in the range of 0.01 to 1 μm.

To make much of the water permeability and to avoid the increase in water permeation resistance in the membrane, the average pore diameter of the dense layer in the vicinity of the inner surface is preferably in the range of 0.05 to 2 μm which is greater than the average pore diameter of the dense layer in the vicinity of the outer surface, and more preferably in the range of 0.1 to 1.5 μm.

In the invention, the thickness of the dense layer is preferably in the range of 10 to 125 μm, to improve both the stability of the separation characteristic and the water permeability.

To improve the stability of the separation characteristic, the thickness of the dense layer in the vicinity of the outer surface is preferably in the range of 25 to 100 μm, and more preferably in the range of 40 to 75 μm.

To avoid the increase in water permeation resistance in the membrane, the thickness of the dense layer in the vicinity of the inner surface is preferable in the range of 15 to 75 μm which is smaller than that of the dense layer in the vicinity of the outer surface, and more preferably in the range of 20 to 50 μm.

To avoid the increase in water permeation resistance in the membrane, the dense layer in the vicinity of the outer surface is located preferably at a position within 20 μm from the outer surface of the porous membrane layer. It is particularly preferable that the dense layer itself constitutes the outer surface of the porous membrane layer.

To avoid the dense layer in the vicinity of the outer surface and the dense layer in the vicinity of the inner surface from being simultaneously damaged due to external causes, the dense layer in the vicinity of the inner surface is preferably located further from the outer surface of the porous membrane layer and more preferably located at a position within 50 μm from the inner surface of the porous membrane layer. It is particularly preferable that the dense layer itself constitutes the inner surface of the porous membrane layer.

When the hollow porous membrane according to the invention includes a porous membrane layer on a support, the dense layer in the vicinity of the inner surface is preferably located at a position within 50 μm from the outer surface of the support and more preferably located as a body with the support, to avoid the damage due to external causes. In this case, the dense layer means a portion exposed from the support.

The porous membrane layer preferably includes an intermediate porous layer with an average pore diameter equal to or more than 2 μm between the dense layer in the vicinity of the outer surface and the dense layer in the vicinity of the inner surface. Since the intermediate porous layer contributes to the water permeability in the hollow porous membrane according to the invention, the pore diameter thereof is preferably great. However, when the pore diameter thereof is excessively great, the pores become a macro void, which reduces the mechanical strength. Therefore, the average pore diameter of the intermediate porous layer is preferably equal to or less than 8 μm and it is more preferable that fine pores with a diameter equal to or greater than 10 μm are substantially not present. The average pore diameter is more preferably in the range of 3 to 5 μm.

To improve the water permeability, it is preferable that the intermediate porous layer has an inclined structure in which the pore diameter gradually increases from the dense layer in the vicinity of the outer surface to the dense layer in the vicinity of the inner surface and the maximum pore-diameter portion exists between the two dense layers.

To cause both excellent water permeability and mechanical strength to be consistent, it is preferable that the thickness of the intermediate porous layer is in the range of 50 to 150 μm.

The hollow porous membrane according to the invention may include only the above-mentioned porous membrane layer, but preferably includes the porous membrane layer on a hollow support to obtain excellent mechanical strength. Here, "on a support" is described to clarify the positional relation of the porous membrane layer and the support, but the porous membrane layer may permeate the inside of the support through meshes of the support.

The support is not particularly limited, but any material may be properly selected and used as long as it can be formed in a body with the porous membrane layer. A braid can be preferably used as the support, in that the production cost is low, both the flexibility and the shape stability (circularity) of a section can be consistent, and the adhesive property to the porous membrane layer is excellent. A hollow braid obtained by circularly knitting a yarn formed of multi-filaments can be particularly preferably used.

In this case, the porous membrane layer and the support (hollow braid) need not be closely adhered to each other. However, when the adhesive property is low, they may be separated and the porous membrane layer may be peeled off at the time of pulling the hollow fiber membrane.

Therefore, it is preferable in the hollow porous membrane according to the invention that a part of the porous membrane layer is made to permeate the braid through meshes of the hollow braid to form the porous membrane layer and the hollow braid in a body.

To give a satisfactory adhesive property to the porous membrane layer and the support, it is preferable that the porous membrane layer permeates the hollow braid by 50% or more of the thickness of the hollow braid. From the viewpoint of peeling resistance, it is more preferable that portions of the porous membrane layer permeating the braid through different meshes by 50% or more are connected to surround a part of the support. It is also preferable that the portions surrounding a part of the support extend in a fiber axis direction, because the peeling resistance further increases. It is more preferable that the connection in the fiber axis direction has a spiral shape, because the peeling resistance is markedly improved.

In this case, the thickness in the invention means the thickness of the portion exposed from the support.

A process of producing a hollow porous membrane according to the invention will be described below.

The hollow porous membrane according to the invention can be produced by applying and stacking membrane-forming dopes of a first membrane-forming dope and a second membrane-forming dope, which contains a material of a porous membrane layer and a solvent, onto the outer circumferential surface of a hollow support through the use of an annular nozzle and simultaneously coagulating the membrane-forming dopes.

In this case, the coagulation can go ahead from only one surface and a one-body porous membrane structure can be obtained from two species of membrane-forming dopes by this method.

For example, a double-annular nozzle shown in FIG. 1 of Patent Document 4 is used, a hollow support (braid) is caused to pass through a passage of the support, a first membrane-forming dope (inner-layer membrane-forming dope) from a first supply port and a second membrane-forming dope (outer-layer membrane-forming dope) from a second supply port are simultaneously ejected, the first membrane-forming dope is applied onto the outer circumferential surface of the hollow braid, and then the second membrane-forming dope is applied onto the applied layer of the first membrane-forming dope. Thereafter, after idling for a predetermined time, by immersing and coagulating the resultant in a coagulation liquid and washing and drying the resultant, it is possible to obtain the structure of the hollow porous membrane according to the invention.

When the double-annular nozzle is used, the first membrane-forming dope and the second membrane-forming dope are merged in advance in the nozzle, and the dopes are simultaneously ejected from the nozzle surface and applied to the hollow support.

By using a triple-annular nozzle having a central portion, an inner portion, and an outer portion, the membrane-forming dopes may be applied to the hollow support by simultaneously ejecting the first membrane-forming dope from the inner portion and the second membrane-forming dope from the outer portion while passing the hollow support through the central portion.

By using the above-mentioned annular nozzles, it is possible to uniformly apply the first membrane-forming dope and the second membrane-forming dope and not to generate bubbles between layers when the first membrane-forming dope and the second membrane-forming dope are stacked.

Two types of membrane-forming dopes are used in the above-mentioned case, but both the dopes contain a polymer resin, an additive, and an organic solvent.

Examples of the polymer resin used in the membrane-forming dopes include a polysulfone resin, a polyethersulfone resin, a sulfonated polysulfone resin, polyvinylidenefluoride resin, a polyacrylonitrile resin, a polyimide resin, polyamideimide resins, or a polyesteramide resin. These can be properly selected and used as needed, and the polyvinylidenefluoride resin can be preferably used because it is excellent in chemical resistance.

The additive can be used to control the phase-separation or the like, and examples thereof include hydrophilic polymer resins such as mono-ols represented by polyethyleneglycol, diols, triols, and polyvinyl pyrrolidone. These can be properly selected and used as needed, and polyvinyl pyrrolidone can be preferable used because it is excellent in thickening effect.

The organic solvent is not particularly limited as long as it can solve the polymer resins and the additives, and examples thereof include dimethylsulfoxide, dimethylacetamide, and dimethylformamide.

The compositions of the above-mentioned two types of membrane-forming dopes are not particularly limited, and it is preferable that the solvent and the polymer resin used to form a one-body structure out of the two types of membrane-forming dopes at the time of coagulating the dopes are the same kinds, in that the peeling of the layers is prevented and the mechanical strength is improved.

When the hollow porous membrane according to the invention is produced using the above-mentioned method, the viscosity of the first membrane-forming dope which is a membrane-forming dope on the inner layer side is preferably higher than that of the second membrane-forming dope which is a membrane-forming dope on the outer layer side.

This is because the membrane-forming dopes are suppressed from excessively permeating the inside of the hollow support by applying the first membrane-forming dope with higher viscosity onto the outer circumferential surface of the hollow support, thereby preventing the hollow portion of the hollow porous membrane from being clogged.

To accomplish this effect, the first membrane-forming dope needs to have satisfactory viscosity and the viscosity at 40° C. is preferably equal to or more than 50,000 Pa·sec. The viscosity is more preferably equal to or more than 100,000 Pa·sec and still more preferably equal to or more than 150,000 Pa·sec.

The method of adjusting the viscosity of the membrane-forming dope is not particularly limited, and may be carried out by changing the molecular weight of the polymer resin or changing the concentration of the polymer resin. A method of blending two or more species of polymer resins with different molecular weights may be used to adjust the molecular weight of the polymer resin.

The method of adjusting the viscosity of the membrane-forming dope can be properly selected as described above, but it is preferable that the concentration of the polymer resin is adjusted in the first membrane-forming dope because the generation of macro voids can be suppressed in the inner layer where the coagulation speed is low. It is preferable that the concentration of the first membrane-forming dope is raised because it is possible to improve the structural stability of the entire porous layer.

On the other hand, it is preferable that the molecular weight of the polymer resin is adjusted in the second membrane-forming dope because the pore ratio in the outer surface of the porous membrane layer can be maintained to be high.

When the membrane-forming dopes are coagulated to form a membrane as described above, the porous structure is formed by phase-separation. Various structures can be obtained depending on the membrane-forming conditions. Representative examples of the porous structure include three structures of a sponge structure derived from a sea-island structure in which the polymer resin is the sea, a particle-aggregation structure derived from a sea-island structure in which the polymer resin is the islands, and a three-dimensional mesh structure derived from a co-continuous structure in which the polymer resin and the solvent are wreathen in a network shape.

These structures can be properly selected. Since the particle-aggregation structure can easily become a structure in which the polymer resin layer is aggregated and which reduces the mechanical strength, it is preferable in the invention that the sponge structure or the three-dimensional mesh structure is employed.

Since the sponge structure tends to become a homogeneous structure in which the pore diameter does not greatly vary in the thickness direction, the sponge structure is a structure suitable for improving the stability of the separation characteristic.

Since the three-dimensional mesh structure tends to become a structure in which the degree of communication between the pores is higher than that of the sponge structure, the three-dimensional mesh structure is suitable for improving the permeability.

The composition of the first membrane-forming dope which is the membrane-forming dope on the inner layer side can be properly selected depending on the membrane structure to be formed.

In the condition for obtaining the sponge structure from the first membrane-forming dope, the composition thereof is not particularly limited similarly. It is preferable that the mass ratio (additive/polymer resin) of the additive and the polymer resin in the membrane-forming dope is less than 0.45.

By setting the mass ratio to be less than 0.45, the homogeneous structure tends to become denser and macro voids are difficult to form.

When the mass ratio is excessively low, the pore diameter is excessively small and thus the permeability tends to be lowered. Accordingly, the mass ratio is preferably set to be equal to or more than 0.3.

An example of the composition of the membrane-forming dope includes 20 to 30 mass % of polyvinylidenefluoride, 5 to 12 mass % of polyvinylpyrrolidone, and 60 to 85 mass % of dimethylacetamide. In this case, the mass ratio (polyvinylpyrrolidone/polyvinylidenefluoride resin) of polyvinylpyrrolidone and polyvinylidenefluoride resins is preferably in the range of 0.3 to 0.45.

The conditions for obtaining the three-dimensional mesh structure from the first membrane-forming dope is not particularly limited, but it is preferable that the mass ratio (additive/polymer resin) of the additive and the polymer resin in the membrane-forming dope is equal to or more than 0.45.

It is preferable that the ratio of the organic solvent is set to be equal to or less than 70 mass %. Accordingly, it is possible to suppress the generation of macro voids and to improve the entire structural stability of the porous membrane layer. The ratio is more preferably equal to or less than 68 mass %.

An example of the composition of the membrane-forming dope includes 20 to 30 mass % of polyvinylidenefluoride, 10 to 20 mass % of polyvinylpyrrolidone, and 55 to 68 mass % of dimethylacetamide. In this case, the mass ratio (polyvinylpyrrolidone/polyvinylidenefluoride resin) of polyvinylpyrrolidone and polyvinylidenefluoride resins is preferably equal to or more than 0.45.

The composition of the second membrane-forming dope which is the membrane-forming dope on the outer layer side is not particularly limited as long as it can form a slope structure in which a dense layer is disposed in the vicinity of the outer surface of the porous membrane layer and the pore diameter gradually increases toward the inner surface of the porous membrane layer by phase-separation.

The composition of the second membrane-forming dope can be properly selected depending on the membrane structure to be formed, but it is preferable that the ratio of the organic solvent is equal to or more than 70 mass % because the surface pore ratio of the porous membrane layer can be raised.

Since the slope structure having no large macro void can be formed, it is preferable that the mass ratio of the additive and the polymer resin is equal to or more than 0.45. An example of the composition of the membrane-forming dope includes 15 to 25 mass % of polyvinylidenefluoride, 5 to 15 mass % of polyvinylpyrrolidone, and 70 to 80 mass % of dimethylacetamide. In this case, the mass ratio (polyvinylpyrrolidone/polyvinylidenefluoride resin) of polyvinylpyrrolidone and polyvinylidenefluoride resins is preferably equal to or more than 0.45.

The thicknesses of the outer layer and the inner layer at the time of application can be properly set. However, when the thickness of the outer layer having the higher ratio of the organic solvent is great, the macro voids are easily generated at the time of forming the membrane. Accordingly, the thickness of the outer layer is preferably equal to or less than 150 μm, more preferably equal to or less than 100 μm, and still more preferably equal to or less than 80 μm.

When the hollow braid is used as the support, a non-solvent against the membrane-forming dope may be buried in advance in the support to prevent the excessive permeation of the membrane-forming dope into the support. An example of the non-solvent when the membrane-forming dope having the above-mentioned composition is used is glycerin. Here, the non-solvent with excessively high coagulation ability of the membrane-forming dope to be used or the non-solvent with excessively high viscosity is not suitable, because it hinders the porous membrane layer from permeating the inside of the support to greatly reduce the peeling resistance.

When polyvinylpyrrolidone is used as the additive, it is preferable that the hollow porous membrane is chemical-washed using sodium hypochlorite in cleaning after the formation of the membrane structure from the coagulation.

Hollow Porous Membrane

FIG. 1 is a sectional view schematically illustrating an example of the hollow porous membrane according to the invention. The hollow porous membrane 1 includes a hollow support 10 and a porous membrane layer 11 disposed on the outer circumferential surface of the support 10.

Support

Figure 2:
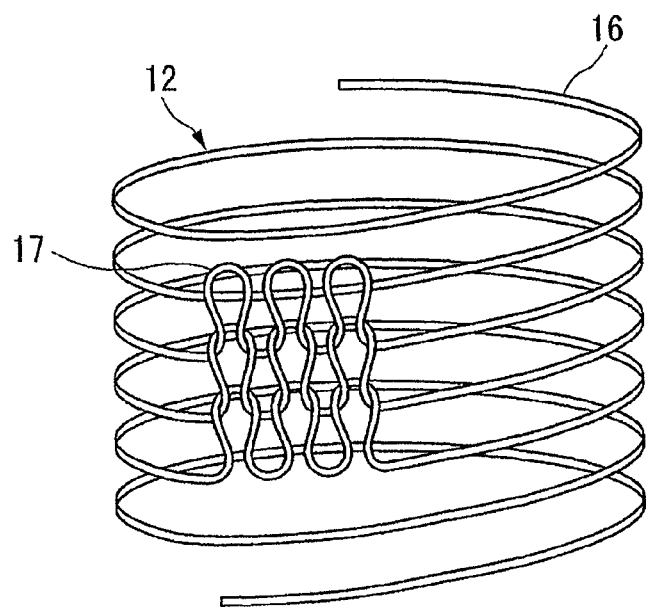
FIG. 2 is a side view illustrating a support formed of a hollow braid.
Figure 3:
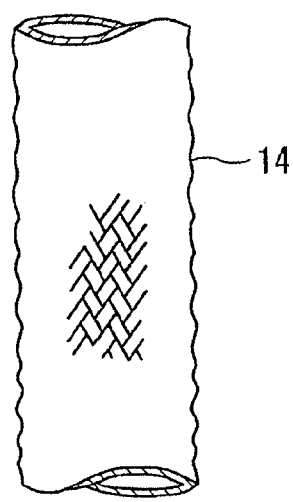
FIG. 3 is a side view illustrating an example of a known hollow braid.

FIG. 2 is a side view illustrating an example of the support. The support 10 is formed of a hollow braid 12 obtained by circularly knitting a yarn 16. The hollow braid 12 is different from the conventional hollow braid 14 shown in FIG. 3.

The circular knitting means to organize a knit fabric using a circular knitting machine.

Figure 4:
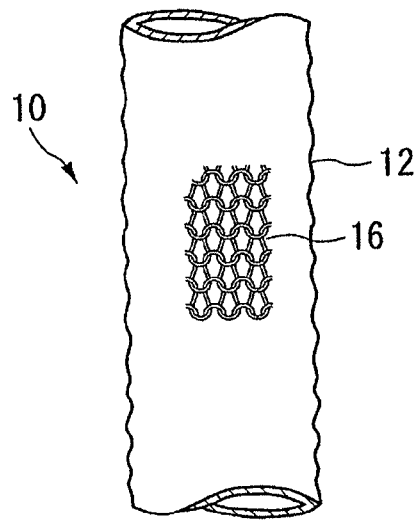
FIG. 4 is a diagram illustrating the structure of a hollow braid.
Figure 5:
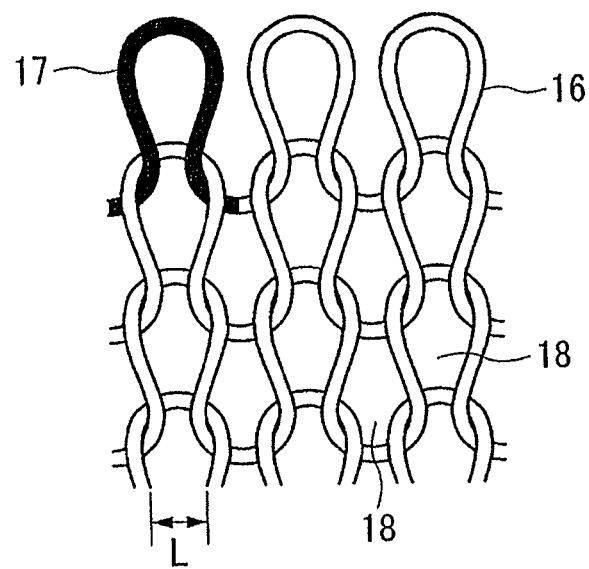
FIG. 5 is an enlarged view illustrating meshes of the hollow braid.

As shown in FIGS. 4 and 5, in the hollow braid 12, loops 17 (black part in FIG. 5) are continuously formed in a spiral shape by bending the yarn 16 and the loops 17 are vertically connected. As shown in FIG. 5, meshes 18 are formed in the loops 17 and between the loops 17.

A multi-filament formed of plural mono-filaments is used as the yarn.

Examples of the fiber constituting the yarn include synthetic fiber, semi-synthetic fiber, recycled fiber, and natural fiber.

Examples of the synthetic fiber include polyamide fiber such as nylon 6, nylon 66, and aromatic polyamide, polyester fiber such as polyethyleneterephthalate, polybutyreneterephthalate, polylactate, and polyglycolic acid, acryl fiber such as polyacrylonitrile, polyolefin fiber such as polyethylene and polypropylene, polyvinylalcohol fiber, polyvinylidenechloride fiber, polyvinylchloride fiber, polyurethane fiber, phenol resin fiber, fluorine fiber such as polyvinylidenefluoroide and polytetrafluoroethylene, and polyalkylene paraoxybenzoate fiber.

Examples of the semi-synthetic fiber include cellulose-derivative fiber using as raw materials cellulose diacetate, cellulose triacetate, chitin, and chitosan and protein fiber called promix.

Examples of the recycled fiber include cellulose recycled fiber (such as rayon, cuprammonium, and polynosic) obtained using a viscose method, a copper-ammonia method, an organic solvent method, and the like.

Examples of the natural fiber include flax and jute.

From the viewpoint of excellent chemical resistance, polyester fiber, acryl fiber, polyvinylalcohol fiber, polyamide fiber, polyolefin fiber, or polyvinylchloride fiber can be preferably used as the fiber, and polyester fiber, acryl fiber, or polyvinylchloride fiber can be particularly preferably used.

From the viewpoint of adhesion between the porous membrane layer 11 and the support 10, fiber soluble in the solvent contained in the membrane-forming dope can be preferably used as the fiber. Examples of the fiber include acryl fiber and polyvinylchloride.

The multi-filament may be obtained by mixing two or more different species of fiber.

The different species mean that at least one of fineness, mono-filament length, mechanical characteristic, and material is different.

For example, by combining plural species of fiber with different fineness to provide fineness which could not be obtained from a single yarn, it is possible to enhance the degree of freedom in structure and characteristic of the support 10.

By combining expensive high-strength fiber with cheap general-use fiber with small strength, the fineness for providing the outer diameter and the inner diameter necessary for the support 10 can be guaranteed by the general-use fiber and the strength insufficient only with the general-use fiber can be guaranteed by the high-strength fiber, thereby providing the support 10 with an excellent balance between cost and strength.

When plural species of fiber with different materials are combined, for example, polyester fiber which is high in strength, low in cost, and excellent in resistance to hypochlorite used to wash the hollow porous membrane and acryl fiber which is soluble in the solvent contained in the membrane-forming dope, low in cost, and excellent in resistance to hypochlorite used to wash the hollow porous membrane.

The fineness of the mono-filament is preferably equal to or less than 5 dtex, and more preferably equal to or less than 3 dtex. When the fineness of the mono-filament is equal to or less than 5 dtex and mono-filament ends of a yarn piecing portion or a fiber-ruptured portion protrude from the surface of the support 10, the protruding mono-filament ends can be selectively burned and removed by processing the surface of the support 10 with flame or can be thermally-contracted in the direction of the surface of the support 10, due to the small thermal conductivity or thermal capacity of the mono-filament, thereby preventing the mono-fiber ends from passing through the porous membrane layer 11. When the fineness of the mono-filament is equal to or less than 3 dtex, the strength of the mono-filament is greatly reduced. Accordingly, even when the mono-filament ends of a yarn piecing portion or a fiber-ruptured portion protrude from the surface of the support 10, the mono-filament ends do not pass through the porous membrane layer 11 at the time of applying the membrane-forming dope.

When the mono-filament ends of a yarn-piecing portion or a fiber-ruptured portion protruding from the surface of the support 10 at the time of applying the membrane-forming dope pass through the porous membrane layer 11, large pinholes are formed around the mono-filament ends or portions generated by peeling the mono-filament and the porous membrane layer 11, which have been closely adhered to each other, by repeated stress actions become pinholes, thereby decreasing the separation characteristic of the hollow porous membrane 1.

The number of loops 17 is preferably equal to or more than 5 per circumference. The number of loops 17 is equal to the number of knitting needles of the circular knitting machine to the described later. When the number of loops 17 is equal to or more than 5, the sectional shape of the hollow portion of the support 10 is substantially circular, the crush resistance to an external pressure is improved, and the decrease in water permeability due to a decrease in inner diameter is suppressed.

The upper limit of the number of loops 17 is determined depending on the outer diameter of the hollow braid 12, the fineness of the yarn 16, the size of the meshes, and the like.

The ratio (length/outer diameter) of the length of the loop 17 (black portion in FIG. 5) to the outer diameter of the support 10 is preferably in the range of 0.1 to 0.5. When the ratio is equal to or more than 0.1, the loop 17 is deformed by a bending or twist force acting on the support 10, thereby providing the bending or twist characteristic necessary as the support. When the ratio is equal to or less than 0.5, the crush resistance of the support 10 can be maintained and the buckling resistance to a compressing force parallel to the center axis of the support 10 can be maintained.

The number of meshes 18 is preferably equal to or more than 3 per 1 $mm^2$. When the number of meshes 18 is equal to or more than 3 per $mm^2$, the porous membrane layer 11 and the support 10 can be strongly adhered to each other. Since three-dimensional adhesion portions increase with the increase of the number of meshes 18, the porous membrane layer 11 and the support 10 can be strongly adhered to each other. However, when the number of meshes 18 per unit area becomes greater, the meshes 18 becomes denser and it is more difficult to cause the membrane-forming dope to satisfactorily permeate the support 10 in the thickness direction through the meshes 18.

To prevent the meshes 18 from becoming denser while increasing the number of meshes 18 per unit area, the fineness of the yarn 16 constituting the support 10 should decreased. However, in this case, since the rupturing resistance of the support 10 or the crush resistance to the external pressure decreases, the upper limit of the number of meshes 18 needs to be properly determined within such a range not to deteriorate the characteristics of the support 10.

The size of the meshes 18 is adjusted into such a size to cause the membrane-forming dope to permeate the support 10 by 50% or more of the thickness and not to excessively permeate the hollow portion, under the conditions of the membrane-forming temperature of the porous membrane layer 11, the application pressure of the membrane-forming dope, the viscosity of the membrane-forming dope, and the thickness of the support 10. The size of the meshes 18 is determined depending on the number of loops 17 per circumference, the fineness of the yarn 16, the false-twist of the yarn 16 (winding process), the length of the meshes 18, and the thermal treatment conditions.

The more opening width (represented by L in FIG. 5) of the meshes 18 is greatly associated with the permeability of the membrane-forming dope into the support 10 and the suitable range thereof varies depending on the membrane-forming conditions. When the viscosity of the membrane-forming dope is several tens of thousands mPa·sec which is used in a general wet spinning process, the suitable range thereof is preferably in the range of 0.01 mm to 0.3 mm. When the maximum opening width of the meshes 18 is equal to or more than 0.01, the membrane-forming dope can permeate the support 10 through the meshes 18. When the maximum opening width is equal to or less than 0.3 mm, the membrane-forming dope can be suppressed from excessively permeating the support 10 to clog the hollow portion of the support 10 through the meshes 18.

All or a part of the surface of the support 10 preferably has a color different from that of the porous membrane layer 11. When the color of the surface of the support 10 is different from that of the porous membrane layer 11 and the porous membrane layer 11 is peeled off from the support 10, the peeling portion can be easily confirmed with naked eyes.

Process of Producing Support

Figure 6:
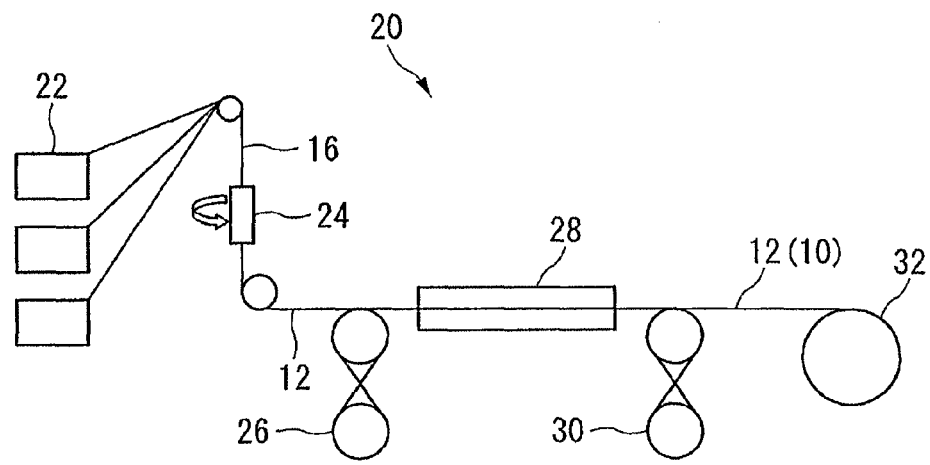
FIG. 6 is a diagram schematically illustrating the configuration of a support producing apparatus.

FIG. 6 is a diagram schematically illustrating the configuration of a support producing apparatus. The support producing apparatus 20 includes a bobbing 22, a circular knitting machine 24 circularly knitting the yarn 16 drawn out of the bobbing 22, a braid feeder 26 drawing the hollow braid 12 knitted by the circular knitting machine 24 with a constant tension, a heating die 28 heating the hollow braid 12, a pickup device 30 picking up the heated hollow braid 12, and a winder 32 winding the hollow braid 12 as the support 10 about a bobbin.

Figure 7:
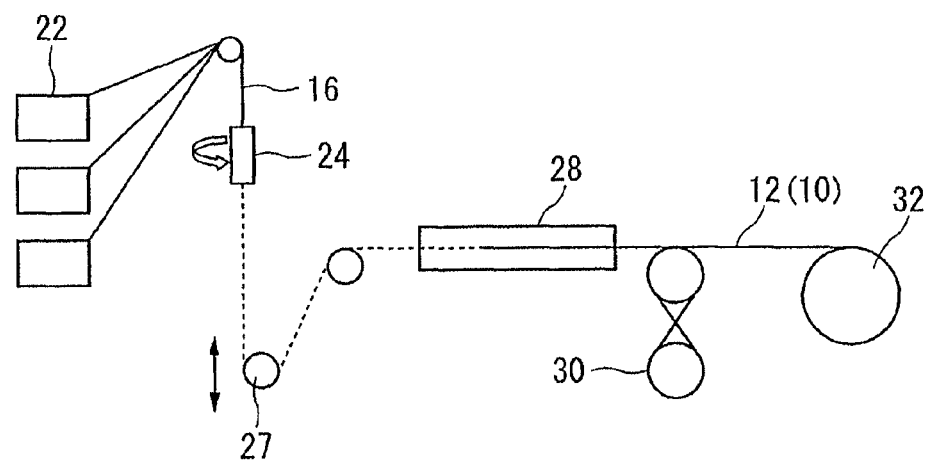
FIG. 7 is a diagram schematically illustrating the configuration of a support producing apparatus.

As shown in FIG. 7, a constant load (tension) may be applied thereto using a dancer roll instead of the braid feeder 26 drawing the hollow braid 12 with a constant tension.

The circular knitting machine 24 includes a hollow cylinder rotating, a spindle disposed inside the cylinder so as not to rotate, plural knitting needles disposed on the outer circumference of the spindle so as to vertical move, and a yarn guide being fixed to the cylinder to rotate therewith and feeding yarns to the plural knitting needles vertical moving. The outer diameter and the inner diameter of the support 10, the number of loops 17 per circumference, and the size of the meshes 18 are determined depending on the number of knitting needles, the circumferential diameter of the spindle mounted with the knitting needles, and the fineness of the yarn 16.

The heating die 28 includes a main body formed of a metal block or plate and a heater. A through-hole (not shown) is formed in the main body of the heating die 28.

The inner diameter D of the through-hole close to the inlet of the hollow braid 12 is equal to or slightly more than the outer diameter D' of the hollow braid 12 before the heat treatment. The inner diameter d of the through-hole close to the outlet of the hollow braid 12 is equal to or less than the outer diameter D' of the hollow braid 12 (support 10) before the heat treatment and is equal to the outer diameter d' of the hollow braid 12 after the heat treatment. To avoid the catch of the hollow braid 12, it is preferable that the through-hole gradually decreases in diameter from the inlet to the outlet and the inner circumferential surface is tapered.

A Nelson roll, a nip roll, a calendar roll, and the like can be used in the braid feeder 26 and the pickup device 30. The nip roll may crush the hollow braid 12 or the support 10. When the braid is crushed, the hollow portion is clogged and thus does not serve as the support for the hollow porous membrane. Therefore, the Nelson roll or the calendar roll can be preferably used in the braid feeder 26 and the pickup device 30. To pick up the support 10 using these rolls, the contact area of the roll and the hollow braid 12 or the support 10 needs to increase to a certain extent. In case of the calendar roll, the number of rolls needs to increase so as to guarantee the contact area between the hollow braid 12 and the support 10. The Nelson roll is more preferable, in that the contact area can be guaranteed by winding the hollow braid 12 and the support 10 about two rolls by plural times.

The number of bobbins 22 may be 1 or 2 or more, and preferably 2 or more. When yarns drawn out of n bobbins on which yarns with fineness of X/n are wound are knitted into one (where n is an integer equal to or more than 2), the amount of yarn drawn out of one bobbin is 1/n and the yarn piecing interval is n times greater than that in the case where the yarn drawn out of one bobbin on which the yarn 16 with fineness of X is wound is knitted, where it is assumed that the mass of the yarn wound on one bobbing is constant.

The process of producing the support 10 using the support producing apparatus 20 will be described below.

The support 10 is produced by the production method including the process of (a) and the process of (b) to be described below.

(a) A process of circularly knitting the yarn 16 to form the hollow braid 12.

(b) A process of heating the hollow braid 12 at a temperature higher than the thermal deformation temperature of fiber and lower than the fiber melting temperature while regulating the outer diameter thereof.

The Process of (a):

The hollow braid 12 is knitted by the circular knitting machine 24.

The braiding speed slight varies depending on the shape of the hollow braid 12, but is almost determined depending on the number of rotations of the cylinder. The number of rotations of the cylinder can be set to the range of 1 to 4000 rμm and is preferably set to the range of 100 to 3000 rμm because the braid can be knitted stably. At this time, the braiding speed is about 6 to 200 m/hr and is higher by one digit than the braiding speed of the knitted braid.

The Process of (b):

The hollow braid 12 includes fiber ends protruding from the surface in the yarn-piecing portions or the fiber-ruptured portions. Therefore, it is preferable that the fiber ends of the yarn-piecing portions or the fiber-ruptured portions are pushed and fixed to the surface of the support 10 by heating the hollow braid 12 while regulating the outer diameter. Accordingly, the fiber ends do not form pinholes through the porous membrane layer and thus the separation characteristic of the hollow porous membrane does not decrease.

The hollow braid 12 has structural flexibility, but the flexibility (variation in outer diameter) of the hollow braid 12 can be suppressed by performing the heat treatment.

At the time of passing through the heating die 28, the hollow braid 12 is heated at a temperature lower than the melting temperature of the yarn 16 used as a raw material. Accordingly, the hollow braid 12 is thermally contracted to suppress the flexibility and to make the meshes denser. In a straight portion 14c in the vicinity of the outlet 14b, the outer diameter of the hollow braid 12 is regulated into a desired outer diameter d'. Since the hollow braid 12 is processed at a temperature lower than the melting temperature of the yarn, the yarn of the surface of the braid is not melted. As a result, the membrane-forming dope can permeate the meshes 18 satisfactorily and thus the adhesive property of the porous membrane layer 11 and the support 10 can be maintained. When the surface of the support 10 is melted, the meshes 18 are clogged and do not pass processing water, thereby not exhibiting the function of a filtration membrane.

Porous Membrane Layer

Examples of the material of the porous membrane layer 11 include polyvinylidenefluoride, polysulfone, polyacrylonitrile, polyvinylpyrrolidone, and polyethyleneglycol. Among these, polyvinylidenefluoride or a combination of polyvinylidenefluoride and polyvinylpyrrolidone can be preferably used from the viewpoint of chemical resistance and heat resistance.

The porous membrane layer 11 may be a single layer or a composite porous membrane layer of two or more layers.

It is preferable that the porous membrane layer 11 permeates the support 10 by 50% or more of the thickness of the support through the meshes 18 of the support 10 from the surface of the support 10 to the hollow portion. In the support 10, a portion where the loops 17 of the yarn 16 overlap with each other and a portion where the loops do not overlap with each other exist and the thickness of the portion where the loops 17 overlap with each other is set as the thickness of the support 10.

Figure 20:
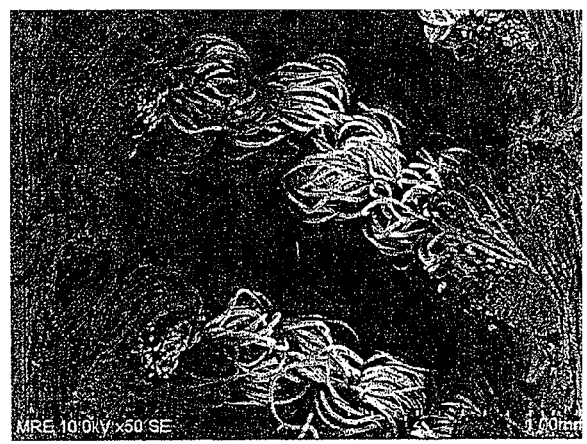
FIG. 20 is a schematic sectional view illustrating an example of a hollow porous membrane according to the invention.

FIG. 20 shows an example of a vertical sectional structure of a membrane where the hollow porous membrane 1 is cut in the center axis direction. In the drawing, a represents the portion where the loops 17 overlap with each other and b represents the portion where the loops 17 do not overlap with each other.

When the porous membrane layer 11 permeates the support 10 by 50% or more of the thickness, the porous membrane layer 11 can surround a part of the yarns 16 constituting the loops 17 and thus the porous membrane layer 11 can be strongly adhered to the support 10. In this case, since the porous membrane layer does not permeate the most of monofilaments of the support and the most of the inner surface of the support is exposed, water passing through the thickness portion can pass up to the inner surface through the support having low water permeation resistance, thereby maintaining the water permeability. When the porous membrane layer 11 goes in over the thickness of the support 10, the most of the inner surface of the support is covered and the hollow portion of the support 10 is thinned. Then, since the flow pressure loss of water in the hollow portion increases to decrease the water permeability, it is preferable that the porous membrane layer 11 permeates the support 10 in the thickness direction by 50% or more and less than 100% of the thickness. When the portions surrounding a part of the yarn 16 are connected in the fiber axis direction, the peeling resistance is further improved, which is preferable. When the shape connecting the portions in the fiber axis direction is spiral, the peeling resistance is markedly improved, which is more preferable.

It is preferable that the fiber ends of the yarn-piecing portions or the fiber-rupturing portions protruding from the surface of the support 10 exists in the porous membrane layer 11 within the range where no pinhole is generated in the porous membrane layer 11.

When the fiber ends exist in the porous membrane layer 11, it is possible to strongly adhere the porous membrane layer 11 to the support 10. The number of fiber ends existing in the porous membrane layer 11 is preferably in the range of 10 to 40 per 1 mm$^2$.

Process of Producing Hollow Porous Membrane

The hollow porous membrane 1 is produced by a production method including the following processes (i) to (vii) when the porous membrane layer 11 is a two-layered composite porous membrane layer.

(i) A process of applying a membrane-forming dope onto the outer circumferential surface of the support 10.

(ii) A process of coagulating the membrane-forming dope applied onto the support 10 to form a first porous membrane layer and to acquire a hollow porous membrane precursor.

(iii) A process of applying a membrane-forming dope onto the outer circumferential surface of the hollow porous membrane precursor.

(vi) A process of coagulating the membrane-forming dope applied onto the hollow porous membrane precursor to form a second porous membrane layer and to acquire the hollow porous membrane 1.

(v) A process of washing the hollow porous membrane 1.

(vi) A process of drying the hollow porous membrane 1.

(vii) A process of winding the hollow porous membrane 1.

Figure 8:
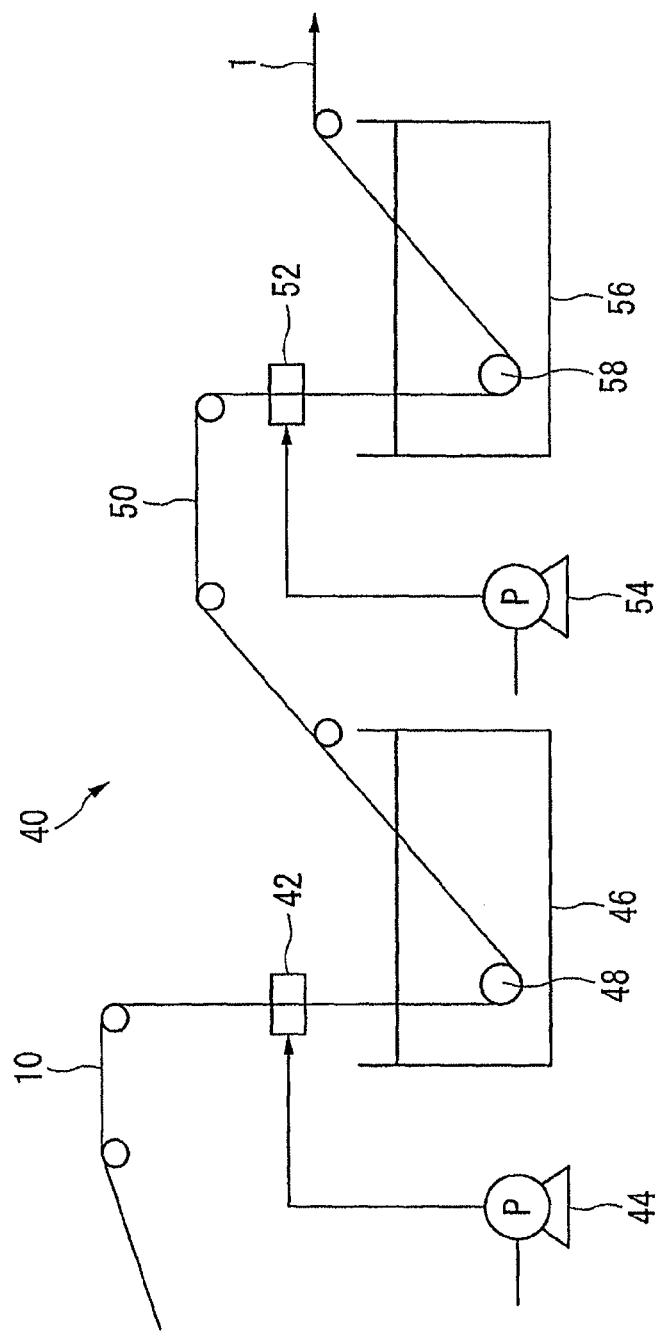
FIG. 8 is a diagram schematically illustrating the configuration of a hollow porous membrane producing apparatus.

FIG. 8 is a diagram schematically illustrating the configuration of a hollow porous membrane producing apparatus used in the processes of (i) to (iv). The hollow porous membrane producing apparatus 40 includes a first annular nozzle 42 continuously applying the membrane-forming dope onto the support 10 continuously fed from a winder (not shown), a first dope feeder 44 feeding the membrane-forming dope to the first annular nozzle 42, a first coagulation bath 46 containing a coagulation liquid for coagulating the membrane-forming dope applied onto the support 10, a first guide roll 48 continuously introducing the support 10 onto which the membrane-forming dope is applied into the first coagulation bath 46, a second annular nozzle 52 continuously applying the membrane-forming dope onto the hollow porous membrane precursor 50 continuously fed from the first coagulation bath 46, a second dope feeder 54 feeding the membrane-forming dope to the second annular nozzle 52, a second coagulation bath 56 containing a coagulation liquid for coagulating the membrane-forming dope applied onto the hollow porous membrane precursor 50, and a second guide roll 58 continuously introducing the hollow porous membrane precursor 50 onto which the membrane-forming dope is applied into the second coagulation bath 56.

Process of (i):

A pipeline through which the support 10 passes is formed at the center of the first annular nozzle 42. In the middle way of the pipeline, a slit-like membrane-forming dope ejecting port in the circumferential direction of the pipeline is formed at two positions upstream and downstream so as to eject two types of membrane-forming dopes with different compositions.

At the time of passing the support 10 through the pipeline, two types of membrane-forming dopes are fed by a predetermined amount from the first dope feeder 44. The membrane-forming dope (2) is first applied onto the outer circumferential surface of the support 10 and the membrane-forming dope (1) is then applied onto the membrane-forming dope (2), thereby forming an applied film with a predetermined thickness.

The inner diameter of the pipeline of the first annular nozzle 42 is slightly greater than the outer diameter of the support 10 and a constant gap (space) is disposed between the inner circumferential surface of the pipeline of the first annular nozzle 42 and the support. The gap (space) is determined depending on the thickness of the applied film, the viscosity of the membrane-forming dope, and the traveling speed of the support 10 and is generally in the range of 0.15 to 0.25 mm.

The membrane-forming dope is a liquid containing the above-mentioned materials of the porous membrane layer and a solvent. Examples of the solvent include N,N-dimethylformamide, N,N-dimethylacetamide, and dimethylsulfoxide. N,N-dimethylacetamide can be preferably used from the viewpoint of high water permeability of the porous membrane layer to be formed.

The concentration of the material of the porous membrane layer in the membrane-forming dope (1) (100 mass %) is preferably in the range of 12 to 25 mass %.

The concentration of the material of the porous membrane layer in the membrane-forming dope (2) (100 mass %) is preferably in the range of 0.1 to 12 mass %.

The temperature of the first annular nozzle 42 is preferably in the range of 20° C. to 40° C.

Process of (ii):

The membrane-forming dope is coagulated to form the first porous membrane layer by bringing the applied film of the membrane-forming dope into contact with the coagulation liquid in the first coagulation bath 46, thereby obtaining the hollow porous membrane precursor 50.

An aqueous solution containing the same solvent as the solvent of the membrane-forming dope can be preferably used as the coagulation liquid. When the solvent of the membrane-forming dope is N,N-dimethylacetamide, the concentration of the solvent is preferably in the range of 1 to 50 mass % of the coagulation liquid (100 mass %).

The temperature of the coagulation liquid is preferably in the range of 50° C. to 90° C.

Processes of (iii) to (iv):

Under the same conditions of the processes of (i) to (ii), the second porous membrane layer is formed on the outer circumferential surface of the hollow porous membrane precursor 50, thereby obtaining the hollow porous membrane 1.

In the process of (iii), an internal coagulation liquid may be used as the membrane-forming dope (2). Examples of the internal coagulation liquid include glycerin, alcohols, and ethyleneglycol.

Process of (v):

For example, the hollow porous membrane 1 is washed with hot water of 60° C. to 100° C. to remove the solvent, is then washed with chemical such as hypochlorite, and is then washed with hot water of 60° C. to 100° C. to remove the chemical.

Processes of (vi) to (vii):

The hollow porous membrane 1 is dried at a temperature equal to or higher than 60° C. and less than 100° C. for a time equal to or longer than 1 minute and less than 24 hours and is then wound on a bobbing or a cassette.

In the hollow porous membrane 1 described above, since the support 10 is the hollow braid 12 obtained by circularly knitting a yarn 16 formed of multi-filaments, the increase in cost is suppressed and the adhesive property between the support 10 and the porous membrane layer 11 is excellent.

That is, the hollow braid 12 obtained by circularly knitting a continuous yarn 16 in a cylinder shape is greater in braiding speed than the knitted braid. Since it is not necessary to segment the yarn 16 into plural bobbins, the yarn-piecing work is simple. Therefore, since the hollow braid 12 is very excellent in productivity and workability, it is possible to suppress the cost in comparison with the knitted braid and to reduce the cost of the hollow porous membrane 1 by using the hollow braid 12 as the support 10 of the hollow porous membrane 1.

Since the meshes 18 of the hollow braid 12 is very greater than the gap between the mono-filaments of the yarn 16 and penetrates the hollow braid 12 from the surface to the hollow portion, the membrane-forming dope can permeate the support 10 through the meshes 18 at the time of forming the porous membrane layer 11, thereby improving the adhesive property between the porous membrane layer 11 and the support 10.

EXAMPLES

The invention will be specifically described with reference to the following examples.

Outer Diameter of Support

The outer diameter of the support was measured as follows.

A sample to be measured was cut into sample pieces of about 10 cm, every several sample pieces was covered with a polyurethane resin. The polyurethane resin was made to enter the hollow portion of the support.

After the polyurethane resin was cured, the sample was sampled into about thin pieces with a thickness (in the membrane length direction) of about 0.5 mm using a razor.

Then, the section of the sampled support was observed with an objective lens of 100 magnifications through the use of a profile projector (PROFILE PROJECTOR V-12 made by NIKON Corp.).

Marks (lines) were aligned with positions of the outer surface in the X direction and the Y direction in the support section in observation and the outer diameter was read. This operation was repeated three times to acquire the average value of the outer diameters.

Inner Diameter of Support

The inner diameter of the support was measured as follows.

The samples to be measured were sampled in the same way as sampling the samples from which the outer diameters were measured.

Then, the section of the sampled support was observed with an objective lens of 100 magnifications through the use of a profile projector (PROFILE PROJECTOR V-12 made by NIKON Corp.).

Marks (lines) were aligned with positions of the inner surface in the X direction and the Y direction in the support section in observation and the inner diameter was read. This operation was repeated three times to calculate the average value of the inner diameters.

Outer Diameter of Hollow Porous Membrane

The outer diameter of the hollow porous membrane was measured as follows.

A sample to be measured was cut into sample pieces of about 10 cm and every several sample pieces was covered with a polyurethane resin. The polyurethane resin was made to enter the hollow portion of the support.

After the polyurethane resin was cured, the sample was sampled into about thin pieces with a thickness (in the membrane length direction) of about 0.5 mm using a razor.

Then, the section of the sampled hollow porous membrane was observed with an objective lens of 100 magnifications through the use of a profile projector (PROFILE PROJECTOR V-12 made by NIKON Corp.).

Marks (lines) were aligned with positions of the outer surface in the X direction and the Y direction in the section of the hollow porous membrane in observation and the outer diameter was read. This operation was repeated three times to calculate the average value of the outer diameters.

Inner Diameter of Hollow Porous Membrane

The inner diameter of the hollow porous membrane was measured as follows.

The samples to be measured were sampled in the same way as sampling the samples from which the outer diameters were measured.

Then, the section of the sampled hollow porous membrane was observed with an objective lens of 100 magnifications through the use of a profile projector (PROFILE PROJECTOR V-12 made by NIKON Corp.).

Marks (lines) were aligned with positions of the inner surface in the X direction and the Y direction in the section of the hollow porous membrane in observation and the inner diameter was read. This operation was repeated three times to calculate the average value of the inner diameters.

Thickness of Porous Membrane Layer

In the examples, the thickness of the porous membrane layer means the thickness from the surface of the support to the surface of the hollow porous membrane and was measured as follows.

The samples to be measured were sampled in the same way as sampling the samples from which the outer diameters were measured.

Then, the section of the sampled hollow porous membrane was observed with an objective lens of 100 magnifications through the use of a profile projector (PROFILE PROJECTOR V-12 made by NIKON Corp.).

Marks (lines) were aligned with positions of the outer surface and the inner surface in the 3-O'clock direction in the section of the hollow porous membrane in observation and the thickness was read. Similarly, the thickness was read in the order of 9-O'clock, 12-O'clock, and 6-O'clock directions. This operation was repeated three times to calculate the average value of the inner diameters.

Pore Diameter of Porous Membrane Layer

The pore diameter of the porous membrane layer was measured as follows.

A sectional structure to be measured was photographed with 5,000 magnifications through the use of a scanning electron microscope and the average pore diameter of the structure was calculated by performing an image analysis process of the acquired photograph. IMAGE-PRO PLUS Version 5.0 made by Media Cybernetics Inc. was used as the image analysis software.

Water Permeability of Hollow Porous Membrane

The water permeability of the hollow porous membrane was measured as follows.

A sample to be measured was cut by 4 cm, and the hollow portion of the cut surface was sealed with a polyurethane resin.

Then, the sample was depressurized in ethanol for 5 or more minutes, and was then immersed in pure water for replacement.

A container was filled with pure water (25° C.), was connected to the other sectional surface of the sample with a tube, an air pressure of 200 kPa was applied to the container, and the amount of pure water flowing from the sample was measured for 1 minute. This operation was repeated three times and the average value thereof was calculated. The water permeability was obtained by dividing the resultant value by the surface area of the sample.

Rupturing Strength of Hollow Porous Membrane

Regarding the rupturing strength of the hollow porous membrane, a tensile load was applied in a state where the hollow porous membrane was chucked with a chuck portion of a Tensilon type tensile tester through the use of a Tensilon type tensile tester (UCT-1T made by Orientech Co.), and the degree of elongation of the support with the variation in load was measured until the hollow porous membrane is ruptured. This operation was repeated three times and the average value of the loads with which the hollow porous membrane was ruptured was calculated.

Degree of Permeation of Porous Membrane Layer into Support

When the hollow porous membrane 1 was cut in a direction perpendicular to the center axis, the thickness of a portion (portion in which the loops 17 overlap with each other) with the greatest thickness of the support 10 in one sectional surface was set as "a". The distance from a line, which connects the positions where the porous membrane layer mostly permeates the support, on the outermost surface of the support to the position of the porous membrane layer mostly permeating the inside of the support is set as "c" (see FIG. 21).

The degree of permeation of the porous membrane layer into the support is calculated by the following expression.

Degree of permeation of porous membrane layer into support(%)=$c/a \times 100$

Figure 21:
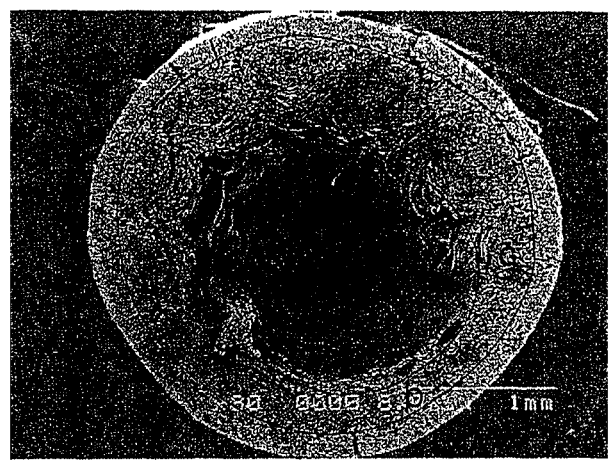
FIG. 21 is a schematic sectional view illustrating an example of a hollow porous membrane according to the invention.

In FIG. 21, b represents the thickness of the portion where the loops 17 do not overlap with each other.

Peeling Resistance of Hollow Porous Membrane

Regarding the peeling resistance of the hollow porous membrane, one surface of the hollow porous membrane was cut in the fiber axis direction with a razor, the hollow porous membrane was developed in a flat membrane shape, the porous membrane was bonded to a packing tape so that the outer surface of the porous membrane faces the bonding surface of the packing tape, the support portion was peeled off from the packing tape with a pinset, and it was evaluated whether the porous membrane is peeled off from the support.

Separation Characteristic of Hollow Porous Membrane

The separation characteristic of the hollow porous membrane was evaluated on the basis of the maximum pore diameter calculated using a bubble point method. The maximum pore diameter was measured using ethanol as a measuring medium on the basis of JIS K 3832.

Example 1

Production of Support

The support 10 formed of a hollow braid 12 was produced using the support producing apparatus 20 shown in FIG. 6.

A polyester fiber (with the fineness of 84 dtex and the number of filaments of 36) was used as the yarn. Five bobbins 22 on which 5 kg of the polyester fibers were wound were prepared. A desktop knitting machine (with the number of knitting needles of 12, a needle size of 16 gauge, and a circumferential diameter of a spindle of 8 mm, made by Marui Textile Machinery Co., Ltd.) was used as the circular knitting machine 24. The Nelson roll was used as the braid feeder 26 and the pickup device 30. A stainless die (with an inner diameter D of 5 mm, an inner diameter d of 2.2 mm, and a length of 300 mm) having a heater was used as the heating die 28.

The polyester fibers drawn out of the five bobbins 22 were merged into a yarn 16 (with the total fineness of 420 dtex), the yarn was circularly knitted by the circular knitting machine 24 to form a hollow braid 12, the hollow braid 12 was made to pass through the heating die 28 at 195° C., and the heated hollow braid 12 was wound as the support 10 on the winder 32 at a winding speed of 100 m/hr. The support 10 was continuously produced until the polyester fibers of the bobbins 22 ran out.

The outer diameter of the obtained support 10 was about 2.1 mm and the inner diameter thereof was about 1.3 mm. The number of loops 17 of the hollow braid 12 constituting the support 10 was 12 per circumference and the maximum passage width of the meshes 18 was about 0.05 mm. The length of the support 10 was 12,000 m.

Production of Hollow Porous Membrane

A hollow porous membrane 1 was produced using the hollow porous membrane producing apparatus 40 shown in FIG. 8.

Polyvinylidenefluoride A (product name, Kynar 301F, made by ATOFINA Japan K.K.), polyvinylidenefluoride B (product name, Kynar 9000LD, made by ATOFINA Japan K.K.), polyvinylpyrrolidone (product name, K-90, made by ISP Corp.), and N,N-dimethylacetamide were mixed with the mass ratios shown in Table 1 to prepare membrane-forming dope (1) and membrane-forming dope (2).

TABLE 1

| Composition (mass %) | Membrane-forming dope (1) | Membrane-forming dope (2) |
| --- | --- | --- |
| Polyvinylidenefluoride A | 12 | 3 |
| Polyvinylidenefluoride B | 8 | 2 |
| Polyvinylpyrrolidone | 10 | 2 |
| N,N-dimethylacetamide | 70 | 93 |
| Temperature of membrane-forming dope | 60° C. | 50° C. |
| Concentration of polyvinylidenefluroide in membrane-forming dope | 20% | 5% |

Process of (i):

The first annular nozzle 42 was kept at 30° C., membrane-forming dope (2) was ejected from the first ejection port on the upstream side while passing the support 10 through the pipeline to apply membrane-forming dope (2) onto the outer circumferential surface of the support 10, and membrane-forming dope (1) was ejected from the second ejection port on the downstream side to apply membrane-forming dope (1) onto membrane-forming dope (2).

Process of (ii):

The support 10 onto which the membrane-forming dopes were applied was made to pass through a coagulation liquid (containing 5 mass % of N,N-dimethylacetamide and 95 mass % of water) kept at 80° C. in the first coagulation bath 46 to form the first porous membrane layer, and the direction was switched by the first guide roll 48 to pull up the resultant from the first coagulation bath 46, obtaining the hollow porous membrane precursor 50.

Process of (iii):

While passing the hollow porous membrane precursor 50 through the second annular nozzle 52 kept at 30° C., glycerin (First Class, made by Wako Pure Chemical Industries Ltd.) as an inner coagulation liquid was ejected from the first ejection port on the upstream side to apply the glycerin onto the first porous membrane layer and membrane-forming dope (1) was ejected from the second ejection port on the downstream side to apply membrane-forming dope (1) onto the glycerin.

Process of (iv):

Under the same conditions as the process of (ii), the second porous membrane layer was formed on the outer circumferential surface of the hollow porous membrane precursor 50, thereby obtaining the hollow porous membrane 1.

Process of (v):

The hollow porous membrane 1 was washed with hot water of 98° C. for 3 minutes to remove remaining parts of N,N-dimethylacetamide and polyvinylpyrrolidone, and then the processes of (x) to (z) were repeatedly performed two times to remove the remaining polyvinylpyrrolidone until the mass ratio thereof becomes less than 2 mass % in terms of the porous membrane layer 11.

(x) A process of immersing the hollow porous membrane 1 in 50,000 mg/L of a sodium hypochlorite aqueous solution.

(y) A process of heating the hollow porous membrane 1 in a steam bath of 90° C. for 2 minutes.

(z) A process of washing the hollow porous membrane 1 with hot water of 90° C. for 3 minutes.

Processes of (vi) to (vii):

The hollow porous membrane 1 was dried at 85° C. for 10 minutes and was then wound on a bobbin by a winder.

The outer diameter of the resultant hollow porous membrane 1 was about 2.80 mm, the inner diameter thereof was about 1.2 mm, the thickness of the porous membrane layer 11 was about 350 μm in average, the bubble point was 160 kPa, and the water permeability was 105 $m^3/m^2/h/MPa$.

The peeling resistance of the hollow porous fiber membrane was tested. All of the second layer and the layers subsequent to the second layer of the hollow porous fiber membrane were peeled off from the first layer and were left on the packing tape. The same test was performed on the first layer of the hollow porous fiber membrane. The entire first layer was not peeled off from the support and a part of the skin of the first layer was left on the packing tape.

The hollow porous membrane 1 was cut in the direction perpendicular to the center axis and the sectional surface was observed. The porous membrane layer 11 permeated the yarn 16 only by about 30% from the surface. On the other hand, the porous membrane layer 11 permeated the hollow portion of the support 10 through the meshes 18 and the porous membrane layer 11 was strongly adhered to the support 10. A part of the porous membrane layer 11 was thinly adhered to the inner circumferential surface of the hollow portion of the support 10, but the inner diameter of the hollow portion was almost the same as that before applying the membrane-forming dope.

Example 2

Production of Hollow Porous Membrane

A hollow porous membrane 1 was produced in the same was as produced in Example 1, except that only membrane-forming dope (1) was applied onto the outer circumferential surface of the support 10 through the use of the first annular nozzle 42.

The outer diameter of the hollow porous membrane 1 was about 2.78 mm, the inner diameter thereof was about 1.2 mm, the thickness of the porous membrane layer 11 was about 340 μm in average, the bubble point was 110 kPa, and the water permeability was 115 $m^3/m^2/h/MPa$.

The peeling resistance of the hollow porous fiber membrane was tested. All of the second layer and the layers subsequent to the second layer of the hollow porous fiber membrane were peeled off from the first layer and were left on the packing tape. The same test was performed on the first layer of the hollow porous fiber membrane. The entire first layer was not peeled off from the support and a part of the skin of the first layer was left on the packing tape.

The hollow porous membrane 1 was cut in the direction perpendicular to the center axis and the sectional surface was observed. The porous membrane layer 11 permeated the yarn 16 up to only the outermost surface. On the other hand, the porous membrane layer 11 permeated the support 10 by about 90% of the thickness through the meshes and the porous membrane layer 11 was strongly adhered to the support 10 in a state where parts of the loops 17 of the yarn 16 are covered with the porous membrane layer 11.

Example 3

Production of Support

Polyester fiber A (with the fineness of 84 dtex and the number of filaments of 72) and polyester fiber B (high-strength polyester fiber with the fineness of 235 dtex and the number of filaments of 24) were used as the yarn 16. A bobbin A on which 5 kg of polyester fiber A was wound and two bobbins B (with the total fineness of 554 dtex) on which 5 kg of polyester fiber B was wound were wound were prepared as the bobbin 22. A desktop knitting machine (with the number of knitting needles of 10, a needle size of 16 gauge, and a circumferential diameter of a spindle of 10 mm, made by Marui Textile Machinery Co., Ltd.) was used as the circular knitting machine 24. The support 10 was produced until polyester fiber A of bobbin A runs out, in the same way as described in Example 1 except the above-mentioned description.

The outer diameter of the obtained support 10 was about 2.1 mm and the inner diameter thereof was about 1.2 mm. The number of loops 17 of the hollow braid 12 constituting the support 10 was 10 per circumference and the maximum passage width of the meshes 18 was about 0.15 mm. The length of the support 10 was 4,200 m.

Production of Hollow Porous Membrane

A hollow porous membrane 1 was produced in the same way as described in Example 2, except that the hollow braid 12 was used as the support 10.

The outer diameter of the hollow porous membrane 1 was about 2.8 mm, the inner diameter thereof was about 1.1 mm, the thickness of the porous membrane layer 11 was about 340 µm in average, and the water permeability was 105 m³/m²/h/MPa.

The hollow porous membrane 1 was cut in the direction perpendicular to the center axis and the sectional surface was observed. The porous membrane layer 11 permeated the yarn 16 up to the deep portion in the region where polyester fiber A was located on the surface, and permeated the yarn 16 up to only the outermost surface in the region where polyester fiber B was located on the surface. On the other hand, the porous membrane layer 11 permeated the support 10 by about 80% of the thickness through the meshes 18 and the porous membrane layer 11 was strongly adhered to the support 10.

The rupturing strength of the hollow porous membrane 1 was about 400 N which is about 1.5 times that of the hollow porous membrane 1 according to Example 2.

Example 4

A support 10 formed of a hollow braid 12 was produced using the support producing apparatus 20 shown in FIG. 6.

A polyester fiber (with the fineness of 84 dtex and the number of filaments of 36, pseudo braid) was used as the yarn. Five bobbins 22 on which 5 kg of the polyester fibers were wound were prepared. A desktop knitting machine (with the number of knitting needles of 12, a needle size of 16 gauge, and a circumferential diameter of a spindle of 8 mm, made by Marui Textile Machinery Co., Ltd.) was used as the circular knitting machine 24. The Nelson roll was used as the braid feeder 26 and the pickup device 30. A stainless die (with an inner diameter D of 5 mm, an inner diameter d of 2.5 mm, and a length of 300 mm) having a heater was used as the heating die 28.

The polyester fibers drawn out of the five bobbins 22 were merged into a yarn 16 (with the total fineness of 420 dtex), the yarn was circularly knitted by the circular knitting machine 24 to form a hollow braid 12, the hollow braid 12 was made to pass through the heating die 28 at 210° C., and the heated hollow braid 12 was wound as the support 10 on the winder 32 at a winding speed of 200 m/hr. The support 10 was continuously produced until the polyester fibers of the bobbins 22 ran out.

The outer diameter of the obtained support 10 was about 2.5 mm and the inner diameter thereof was about 1.7 mm. The number of loops 17 of the hollow braid 12 constituting the support 10 was 12 per circumference and the maximum passage width of the meshes 18 was about 0.1 mm. The length of the support 10 was 12,000 m.

19 mass % of polyvinylidenefluoride (product name, Kynar 301F, made by ATOFINA Japan K.K.) and 10 mass % of polyvinylpyrrolidone (product name, K-80, made by ISP Corp.) were agitated and melted with 71 mass % of N,N-dimethylacetamide to prepare a second membrane-forming dope. The viscosity of the second membrane-forming dope at 40° C. was 130,000 mPa·sec.

22 mass % of polyvinylidenefluoride (product name, Kynar 301F, made by ATOFINA Japan K.K.) and 9 mass % of polyvinylpyrrolidone (product name, K-80, made by ISP Corp.) were agitated and melted with 69 mass % of N,N-dimethylacetamide to prepare a first membrane-forming dope. The viscosity of the first membrane-forming dope at 40° C. was 210,000 mPa·sec.

Then, while feeding the second membrane-forming dope to the outer line of the triple annular nozzle with a diameter of 5.24 mmφ kept at 30° C., feeding the first membrane-forming dope to the inner line, and passing the support 10 through the central portion of the nozzle, two types of membrane-forming dopes were applied and stacked onto the braid support, the resultant was made to pass through an air gap of 40 mm, and the resultant was made to pass through a coagulation bath kept at 75° C. containing 8 mass % of N,N-dimethylacetamide and 92 mass % of water to coagulate the resultant.

Then, the solvent was removed therefrom with hot water of 98° C. for 1 minute, the resultant was immersed in 50,000 mg/L of a sodium hypochlorite aqueous solution, was washed with hot water of 98° C. for 15 minutes, was dried at 110° C. for 10 minutes, and was wound, thereby obtaining the hollow porous fiber membrane.

The thickness of the hollow porous fiber membrane from the braid support to the outer surface was 150 µm, the bubble point was 140 kPa, the water permeability was 122 m³/m²/h/MPa, and the load of the rupturing point was 270 N.

This hollow porous fiber membrane was tested for the peeling resistance. The entire hollow porous fiber membrane was not peeled off from the support and only a part of the skin of the hollow porous fiber membrane was left on the packing tape.

Figure 9:
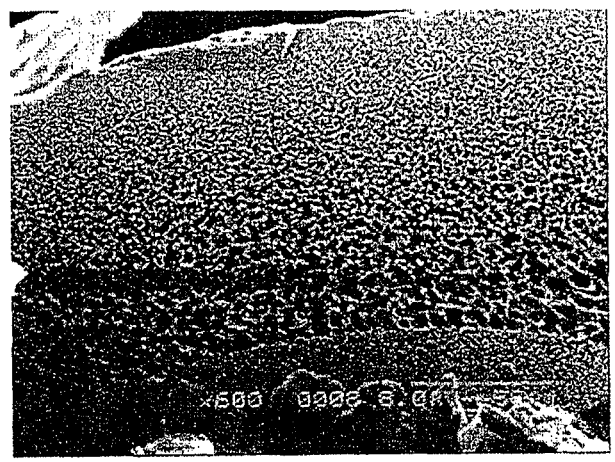
FIG. 9 is a schematic sectional view illustrating an example of a hollow porous membrane according to the invention.
Figure 10:
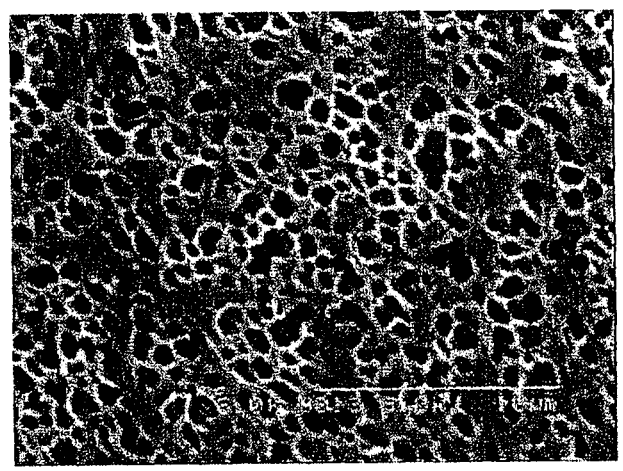
FIG. 10 is a schematic sectional view illustrating an example of a hollow porous membrane according to the invention.
Figure 11:
FIG. 11 is a schematic sectional view illustrating an example of a hollow porous membrane according to the invention.

The sectional structure of the hollow porous fiber membrane was observed with a scanning electron microscope. A dense layer with an average pore diameter of 0.2 µm was formed in the vicinity of the outer surface, a dense layer with an average pore diameter of 0.8 µm having a sponge structure in which the polymer resin is the sea was formed within 40 µm from the inner surface, and an intermediate porous layer with an average pore diameter of 4.8 µm was formed between both dense layers. The porous membrane layer permeated the support 10 by about 90% of the thickness through the meshes of the support. The porous membrane portion did not permeate the mono-filaments of the support 10. The inner surface of the hollow porous fiber membrane was observed with a scanning electron microscope. A part of the support was surrounded with porous membrane portions permeating through the meshes. The porous membrane portions were connected in a spiral shape in the fiber axis direction on the inner surface. The sectional structure photographed by the scanning electron microscope was shown in FIG. 9, the sectional structure in the vicinity of the inner surface was shown in FIG. 10, and the permeation state of the porous membrane layer into the support was shown in FIG. 11.

Example 5

A hollow porous fiber membrane was produced in the same was as described in Example 4, except that a membrane-forming dope obtained by agitating and melting 11.5 mass % of polyvinylidenefluoride A (product name, Kynar 301F, made by ATOFINA Japan K.K.), 11.5 mass % of polyvinylidenefluoride B (product name, Kynar 9000LD, made by ATOFINA Japan K.K.) and 12 mass % of polyvinylpyrrolidone with 65 mass % of N,N-dimethylacetamide was used as the first membrane-forming dope. The viscosity of the first membrane-forming dope at 40° C. was 210,000 mPa·sec.

The thickness of the hollow porous fiber membrane from the braid support to the outer surface was 170 μm, the bubble point was 140 kPa, the water permeability was 143 m$^3$/m$^2$/h/MPa, and the load of the rupturing point was 270 N.

This hollow porous fiber membrane was tested for the peeling resistance. The entire hollow porous fiber membrane was not peeled off from the support and only a part of the skin of the hollow porous fiber membrane was left on the packing tape.

Figure 12:
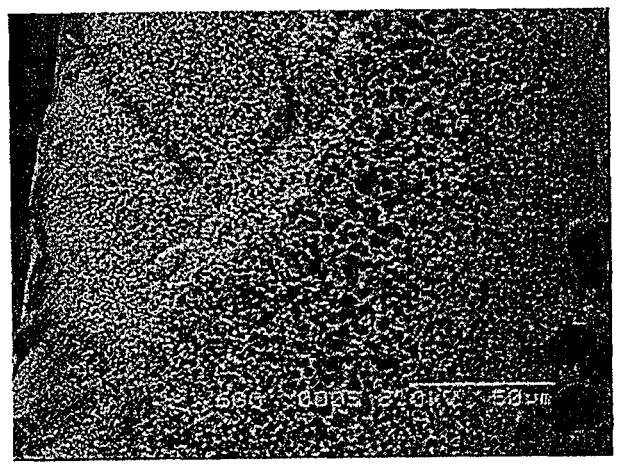
FIG. 12 is a schematic sectional view illustrating an example of a hollow porous membrane according to the invention.
Figure 13:
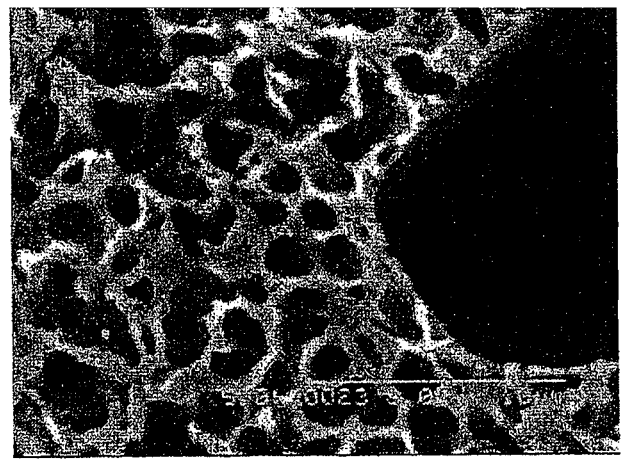
FIG. 13 is a schematic sectional view illustrating an example of a hollow porous membrane according to the invention.

The sectional structure of the hollow porous fiber membrane was observed with a scanning electron microscope. A dense layer with an average pore diameter of 0.2 was formed in the vicinity of the outer surface, a dense layer with an average pore diameter of 1.3 μm having a three-dimensional mesh structure was formed in the vicinity of the inner surface, and an intermediate porous layer with an average pore diameter of 3.6 μm was formed between both dense layers. The porous membrane layer permeated the support 10 by about 70% of the thickness through the meshes of the support. The porous membrane portion did not permeate the mono-filaments of the support 10. The inner surface of the hollow porous fiber membrane was observed with a scanning electron microscope. A part of the support was surrounded with porous membrane portions permeating through the meshes. The porous membrane portions were connected in a spiral shape in the fiber axis direction on the inner surface. The sectional structure photographed by the scanning electron microscope was shown in FIG. 12 and the sectional structure in the vicinity of the inner surface was shown in FIG. 13.

Example 6

A hollow porous fiber membrane was produced in the same was as described in Example 5, except that a membrane-forming dope obtained by agitating and melting 19 mass % of polyvinylidenefluoride A (product name, Kynar 301F, made by ATOFINA Japan K.K) and 11 mass % of polyvinylpyrrolidone with 70 mass % of N,N-dimethylacetamide was used as the second membrane-forming dope and the resultant was made to pass through an air gap of 70 mm. The viscosity of the second membrane-forming dope at 40° C. was 140,000 mPa·sec.

The thickness of the hollow porous fiber membrane from the braid support to the outer surface was 150 μm, the bubble point was 205 kPa, the water permeability was 115 m$^3$/m$^2$/h/MPa, and the load of the rupturing point was 270 N.

This hollow porous fiber membrane was tested for the peeling resistance. The entire hollow porous fiber membrane was not peeled off from the support and only a part of the skin of the hollow porous fiber membrane was left on the packing tape.

Figure 14:
FIG. 14 is a schematic sectional view illustrating an example of a hollow porous membrane according to the invention.
Figure 15:
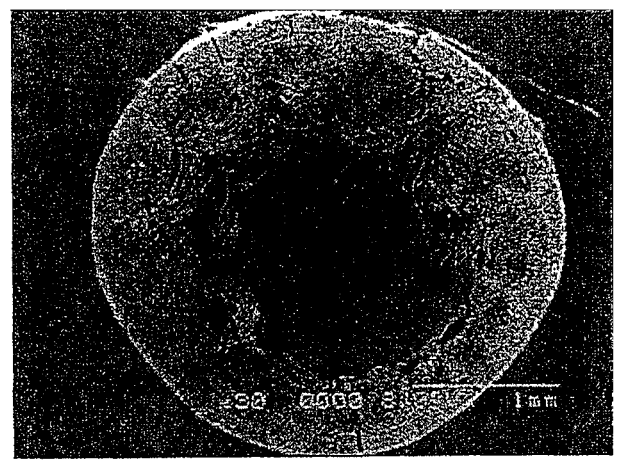
FIG. 15 is a schematic sectional view illustrating an example of a hollow porous membrane according to the invention.
Figure 16:
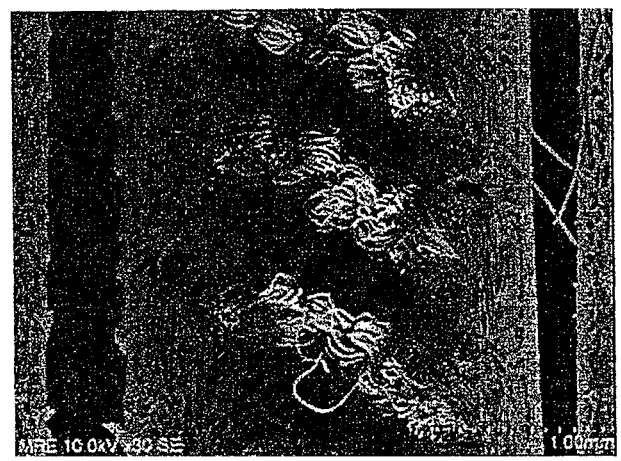
FIG. 16 is a schematic sectional view illustrating an example of a hollow porous membrane according to the invention.
Figure 17:
FIG. 17 is a schematic sectional view illustrating an example of a hollow porous membrane according to the invention.

The sectional structure of the hollow porous fiber membrane was observed with a scanning electron microscope. A dense layer with an average pore diameter of 0.1 μm was formed in the vicinity of the outer surface, a dense layer with an average pore diameter of 1.6 μm having a three-dimensional mesh structure was formed in the vicinity of the inner surface, and an intermediate porous layer with an average pore diameter of 4.6 μm was formed between both dense layers. The porous membrane layer permeated the support 10 by about 60% of the thickness through the meshes of the support. The porous membrane portion did not permeate the mono-filaments of the support 10. The inner surface of the hollow porous fiber membrane was observed with a scanning electron microscope. A part of the support was surrounded with porous membrane portions permeating through the meshes. The porous membrane portions were connected in a spiral shape in the fiber axis direction on the inner surface. The sectional structure photographed by the scanning electron microscope was shown in FIGS. 14 and 15 and the sectional structure in the vicinity of the inner surface was shown in FIGS. 16 and 17.

Example 7

A support 10 formed of a hollow braid 12 was produced using the support producing apparatus 20 shown in FIG. 6.

A polyester fiber (with the fineness of 84 dtex and the number of filaments of 72) was used as the yarn. Six bobbins 22 on which 5 kg of the polyester fibers were wound were prepared. A desktop knitting machine (with the number of knitting needles of 12, a needle size of 16 gauge, and a circumferential diameter of a spindle of 8 mm, made by Marui Textile Machinery Co., Ltd.) was used as the circular knitting machine 24. The Nelson roll was used as the braid feeder 26 and the pickup device 30. A stainless die (with an inner diameter D of 5 mm, an inner diameter d of 3.0 mm, and a length of 300 mm) having a heater was used as the heating die 28.

The polyester fibers drawn out of the six bobbins 22 were merged into a yarn 16 (with the total fineness of 504 dtex), the yarn was circularly knitted by the circular knitting machine 24 to form a hollow braid 12, the hollow braid 12 was made to pass through the heating die 28 at 200° C., and the heated hollow braid 12 was wound as the support 10 on the winder 32 at a winding speed of 100 m/hr. The support 10 was continuously produced until the polyester fibers of the bobbins 22 ran out.

The outer diameter of the obtained support 10 was about 2.9 mm and the inner diameter thereof was about 1.9 mm. The number of loops 17 of the hollow braid 12 constituting the support 10 was 12 per circumference and the maximum passage width of the meshes 18 was about 0.3 mm. The length of the support 10 was 12,000 m.

By ejecting membrane-forming dope (1) from the second ejection port on the downstream side while passing the support 10 through the pipeline of the annular nozzle 42 kept at 30° C., membrane-forming dope (1) was applied onto the support 10.

The membrane-forming dope was coagulated by passing the support 10, onto which the membrane-forming dope was applied, through the coagulation liquid (5 mass % of N,N-dimethylacetamide and 95% of water) kept at 80° C. in the first coagulation bath 46.

Then, the solvent was removed therefrom with hot water of 98° C. for 1 minute, the resultant was immersed in 50,000 mg/L of a sodium hypochlorite aqueous solution, was washed with hot water of 98° C. for 15 minutes, was dried at 110° C. for 10 minutes, and was wound, thereby obtaining the hollow porous fiber membrane.

The thickness of the hollow porous fiber membrane from the braid support to the outer surface was 80 μm, the bubble point was 45 kPa, the water permeability was 58 m$^3$/m$^2$/h/MPa, and the load of the rupturing point was 250 N.

This hollow porous fiber membrane was tested for the peeling resistance. The entire hollow porous fiber membrane was not peeled off from the support and only a part of the skin of the hollow porous fiber membrane was left on the packing tape.

Figure 18:
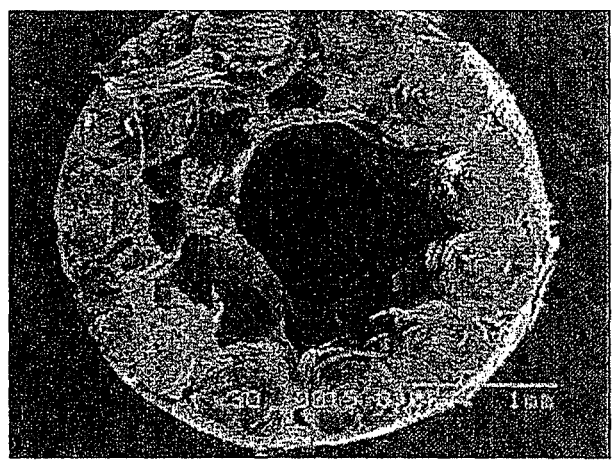
FIG. 18 is a schematic sectional view illustrating an example of a hollow porous membrane according to the invention.

The sectional structure of the hollow porous fiber membrane was observed with a scanning electron microscope. A dense layer with an average pore diameter of 0.2 μm was formed in the vicinity of the outer surface. The porous membrane layer permeated the support 10 by about 100% or more of the thickness through the meshes of the support. The porous membrane portion did not permeate the most mono-filaments of the support 10. The sectional structure photographed by the scanning electron microscope was shown in FIG. 18.

Example 8

A hollow porous fiber membrane was produced in the same way as described in Example 7, except that the support 10 was immersed in a 30% aqueous solution of glycerin in advance before the support 10 passes through the pipeline of the annular nozzle 42.

The thickness of the hollow porous fiber membrane from the braid support to the outer surface was 200 μm, the bubble point was 50 kPa, the water permeability was 45 m$^3$/m$^2$/h/MPa, and the load of the rupturing point was 200 N.

This hollow porous fiber membrane was tested for the peeling resistance. The entire hollow porous fiber membrane was peeled off from the support and was left on the packing tape.

Figure 19:
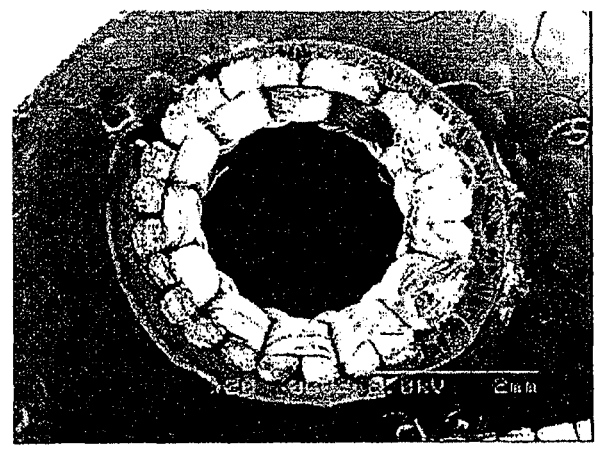
FIG. 19 is a schematic sectional view illustrating an example of a hollow porous membrane according to the invention.

The sectional structure of the hollow porous fiber membrane was observed with a scanning electron microscope. A dense layer with an average pore diameter of 0.2 μm was formed in the vicinity of the outer surface. The porous membrane layer permeated the support 10 by about 30% of the thickness through the meshes of the support. The porous membrane portion did not permeate the most mono-filaments of the support 10. The inner surface of the hollow porous fiber membrane was observed with a scanning electron microscope. The support was not surrounded with the porous membrane portions and the entire support was exposed. The sectional structure photographed by the scanning electron microscope was shown in FIG. 19.

Comparative Example 1

A hollow porous fiber membrane was produced in the same way as described in Example 1, except that a polyester multi-filament singly-knitted braid (multi-filaments; total decitex 830/96 filaments, 16 strokes) was used as the support.

The outer diameter of the hollow porous membrane 1 was about 2.80 mm, the inner diameter thereof was about 1.2 mm, the thickness of the porous membrane layer 11 was about 350 μm in average, the bubble point was 127 kPa, and the water permeability was 107 m$^3$/m$^2$/h/MPa.

The peeling resistance of the hollow porous fiber membrane was tested. All of the second layer and the layers subsequent to the second layer of the hollow porous fiber membrane were peeled off from the first layer and were left on the packing tape. The same test was performed on the first layer of the hollow porous fiber membrane. The entire first layer was peeled off from the support and was left on the packing tape.

The sectional structure of the hollow porous fiber membrane was observed with a scanning electron microscope. The porous membrane layer permeated the support 10 by about 100% of the thickness through the meshes of the support. The porous membrane portion did not permeate the most mono-filaments of the support 10. The inner surface of the hollow porous fiber membrane was observed with a scanning electron microscope. A part of the porous membrane layer was thinly adhered to the inner surface of the support, but neither surrounded the support nor was connected in the fiber axis direction.

INDUSTRIAL APPLICABILITY

The hollow porous membrane according to the invention can be suitably used as a filtration membrane in water treatment such as micro-filtration and ultra-filtration.

Since the porous hollow fiber membrane produced by the above-mentioned process is a one-body porous membrane having a reinforcing support and has a structure in which a dense layer is disposed in the vicinity of the outer surface of the membrane material, an inclined mesh structure of which the pore diameter increases toward the inner surface is formed, and a dense layer is then disposed in the vicinity of the inner surface, the porous hollow fiber membrane can be simply produced and has excellent separation characteristic, water permeability, and mechanical strength.

BRIEF DESCRIPTION OF THE REFERENCE SYMBOLS

1: HOLLOW POROUS MEMBRANE
10: SUPPORT
11: POROUS MEMBRANE LAYER
12: HOLLOW BRAID
14: HOLLOW KNITTED BRAID
16: YARN
17: LOOP
18: MESH
20: SUPPORT PRODUCING APPARATUS
22: BOBBIN
24: CIRCULAR KNITTING MACHINE
26: BRAID FEEDER
27: DANCER ROLL
28: HEATING DIE
30: PICKUP DEVICE
32: WINDER
40: HOLLOW POROUS MEMBRANE PRODUCING APPARATUS
42: ANNULAR NOZZLE
44: DOPE FEEDER
46: COAGULATION BATH
48: GUIDE ROLL
50: HOLLOW POROUS MEMBRANE PRECURSOR
52: ANNULAR NOZZLE
54: DOPE FEEDER

56: COAGULATION BATH
58: GUIDE ROLL

The invention claimed is:

1. A hollow porous membrane, comprising:
  a porous membrane layer comprising an outer dense layer disposed near an outer surface and an inner dense layer disposed near an inner surface; and
  a hollow support, which is a heat treated hollow braid obtained by circularly knitting a single yarn comprising multi-filaments, to obtain a hollow braid, and heat treating the hollow braid,
  wherein the porous membrane layer is disposed on the hollow support.

2. The hollow porous membrane according to claim 1, wherein an intermediate porous layer having a maximum pore-diameter portion is disposed between the outer dense layer and the inner dense layer.

3. The hollow porous membrane according to claim 2, wherein an average pore diameter of the inner and outer dense layers is in a range of 0.01 to 2 µm, and an average pore diameter of the intermediate porous layer is in a range of 2 to 8 µm.

4. The hollow porous membrane according to claim 1, wherein a thickness of the porous membrane layer is 200 µm or less.

5. The hollow porous membrane according to claim 1, wherein the inner dense layer is located at a position less than 50 µm from the inner surface.

6. The hollow porous membrane according to claim 1, wherein the porous membrane layer permeates the hollow support through meshes of the hollow support by 50% or more of a thickness of the hollow support.

7. The hollow porous membrane according to claim 6, wherein the porous membrane layer permeates the hollow support through meshes of the hollow support by 50% or more and less than 100% of the thickness of the hollow support and a part of the hollow support is covered with the porous membrane layer.

8. The hollow porous membrane according to claim 6, wherein a portion not permeated by the porous membrane layer exists among monofilaments of the hollow support.

9. The hollow porous membrane according to claim 1, wherein the inner dense layer is located at a position less than 50 µm from the outer surface of the support.

10. The hollow porous membrane according to claim 1, wherein the multi-filaments are a mixture of two or more different fibers.

11. A hollow porous membrane, comprising:
  a hollow support, and
  a porous membrane layer disposed on an outer circumferential surface of the hollow support,
  wherein the hollow support is a heat treated hollow braid obtained by circularly knitting a single yarn comprising multi-filaments, to obtain a hollow braid, and heat treating the hollow braid.

12. The hollow porous membrane according to claim 11, wherein the porous membrane layer permeates the hollow support through meshes of the hollow support by 50% or more of a thickness of the hollow support.

13. The hollow porous membrane according to claim 12, wherein the porous membrane layer covering a part of the hollow support extends in a fiber axis direction on an inner surface side of the hollow support.

14. The hollow porous membrane according to claim 13, wherein the porous membrane layer covering a part of the hollow support extends in a spiral shape in the fiber axis direction on the inner surface side of the hollow support.

15. A process of producing a hollow porous membrane, the process comprising:
  forming a porous membrane layer by applying a membrane-forming dope, comprising a material of the porous membrane layer and a solvent, to an outer circumferential surface of a hollow support; and
  coagulating the dope applied, to obtain a porous membrane layer disposed on the hollow support,
  wherein the hollow support is a heat treated hollow braid obtained by circularly knitting a single yarn comprising multi-filaments, to obtain a hollow braid, and heat treating the hollow braid.

16. A process of producing the hollow porous membrane according to claim 1, the process comprising:
  successively applying and stacking membrane-forming dopes of a first membrane-forming dope and a second membrane-forming dope onto an outer circumferential surface of a hollow support with an annular nozzle; and
  simultaneously coagulating the membrane-forming dopes which have been applied to the outer circumferential surface.

17. The process according to claim 16, wherein the membrane-forming dopes comprise a polymer resin, an additive, and an organic solvent.

18. The process according to claim 16, wherein the first membrane-forming dope has a high viscosity is applied first onto the outer circumferential surface of the hollow support, to give an applied layer, and the second membrane-forming dope, which has a low viscosity, is applied onto the applied layer of the first membrane-forming dope.

19. The process according to claim 18, wherein the membrane-forming dopes comprise a polymer resin, an additive, and an organic solvent, and a concentration of the polymer resin comprised in the first membrane-forming dope is higher than the concentration of polymer in the second membrane forming dope.

* * * * *